(12) United States Patent (10) Patent No.: US 9,189,024 B2
Knutson et al. (45) Date of Patent: Nov. 17, 2015

(54) DOCK FOR PORTABLE ELECTRONIC DEVICES

(75) Inventors: Edward Alan Knutson, Burnsville, MN (US); Christopher Ray Holloman, Eden Prairie, MN (US); Gary Douglas Huber, Shoreview, MN (US)

(73) Assignee: Vieira Systems Inc., Burnsville, MN (US)

( * ) Notice: Subject to any disclaimer, the term of this patent is extended or adjusted under 35 U.S.C. 154(b) by 404 days.

(21) Appl. No.: 13/603,409

(22) Filed: Sep. 4, 2012

(65) Prior Publication Data

US 2013/0058022 A1 Mar. 7, 2013

Related U.S. Application Data

(60) Provisional application No. 61/611,572, filed on Mar. 16, 2012, provisional application No. 61/530,939, filed on Sep. 3, 2011.

(51) Int. Cl.
 *G06F 1/16* (2006.01)
(52) U.S. Cl.
 CPC .................................... *G06F 1/1632* (2013.01)
(58) Field of Classification Search
 CPC .................................................... G06F 1/1632

USPC .................. 361/679.4–679.45; 710/303, 304
See application file for complete search history.

(56) References Cited

U.S. PATENT DOCUMENTS

| | | | | |
|---|---|---|---|---|
| 5,961,337 A | * | 10/1999 | Kordes | 439/141 |
| 7,643,283 B2 | * | 1/2010 | Jubelirer et al. | 361/679.41 |
| 7,738,247 B2 | * | 6/2010 | Choi | 361/679.43 |
| 8,116,077 B1 | * | 2/2012 | Strauser | 361/679.41 |
| 8,366,480 B2 | * | 2/2013 | Neu et al. | 439/569 |
| 8,369,082 B2 | * | 2/2013 | Madonna et al. | 361/679.41 |
| 2002/0115480 A1 | * | 8/2002 | Huang | 455/573 |
| 2007/0047198 A1 | * | 3/2007 | Crooijmans et al. | 361/686 |
| 2008/0164845 A1 | * | 7/2008 | Choi | 320/115 |
| 2008/0307144 A1 | * | 12/2008 | Minoo | 710/304 |
| 2010/0067190 A1 | * | 3/2010 | Yu | 361/679.41 |
| 2010/0169531 A1 | * | 7/2010 | Bae | 710/303 |
| 2012/0303851 A1 | * | 11/2012 | Tseng et al. | 710/303 |
| 2013/0107126 A1 | * | 5/2013 | Nonomura et al. | 348/725 |

* cited by examiner

*Primary Examiner* — Nidhi Thaker
(74) *Attorney, Agent, or Firm* — Fish & Richardson P.C.

(57) ABSTRACT

This document generally describes docking stations for portable computing devices with one or more of a variety of features, such as a near horizontal tray into which a portable computing device can be placed (e.g., a tray with an angle between 5-25 degrees from horizontal), embedded microphones and/or speakers, and/or input jacks for external microphones and/or speakers.

17 Claims, 40 Drawing Sheets

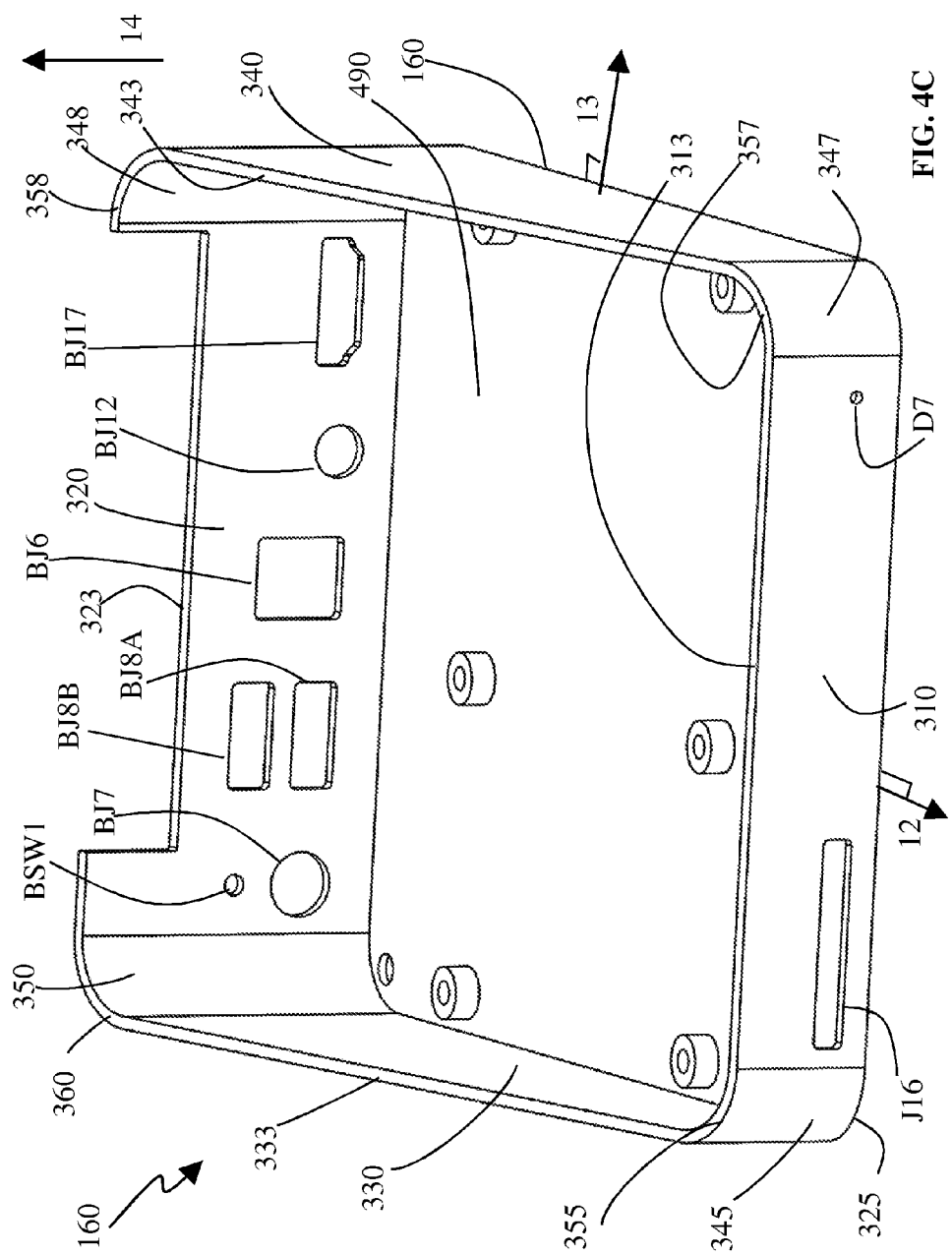

Figure 1A:
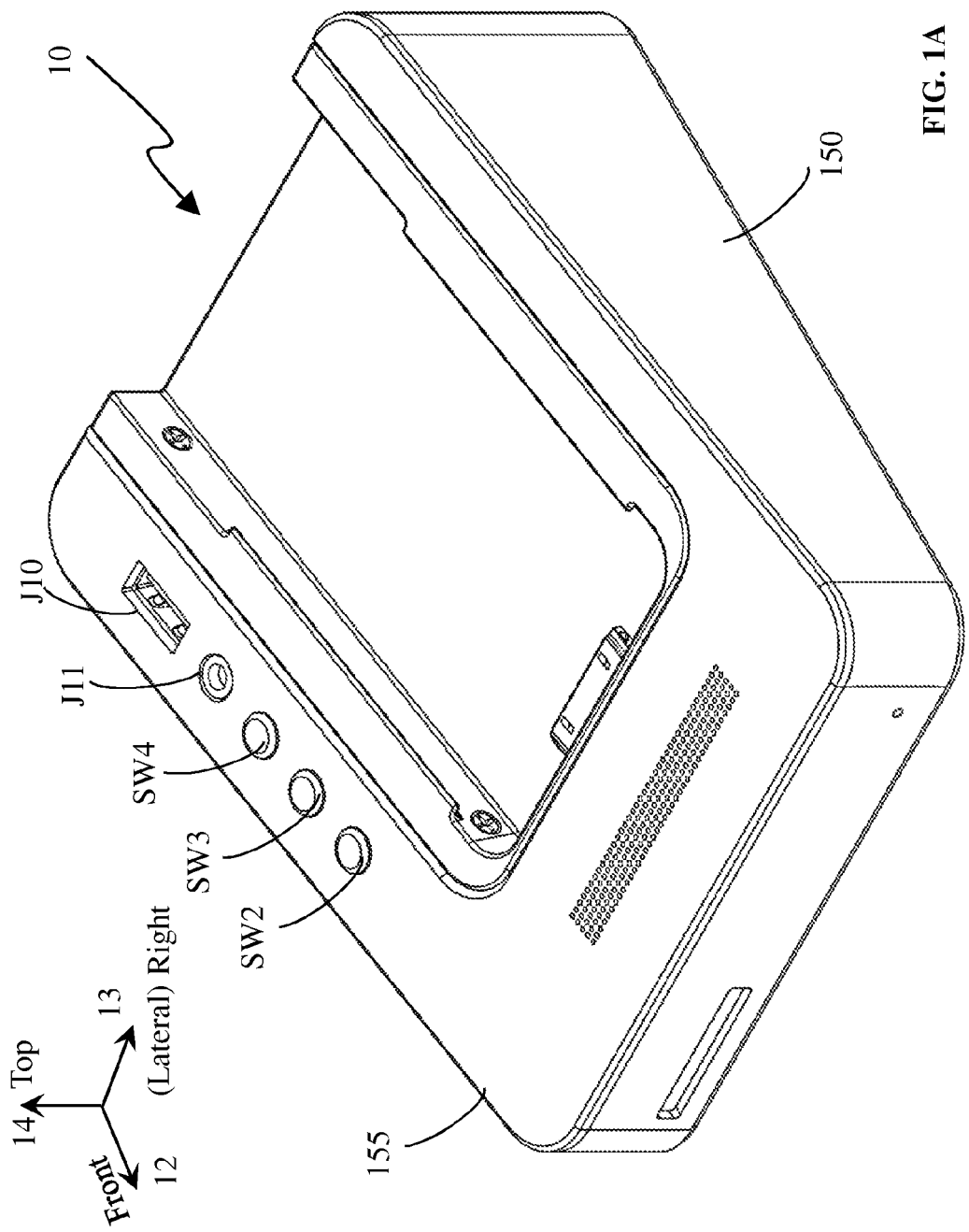

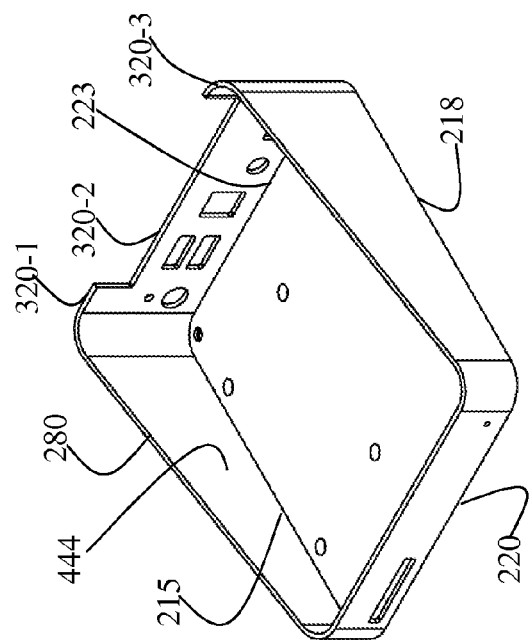
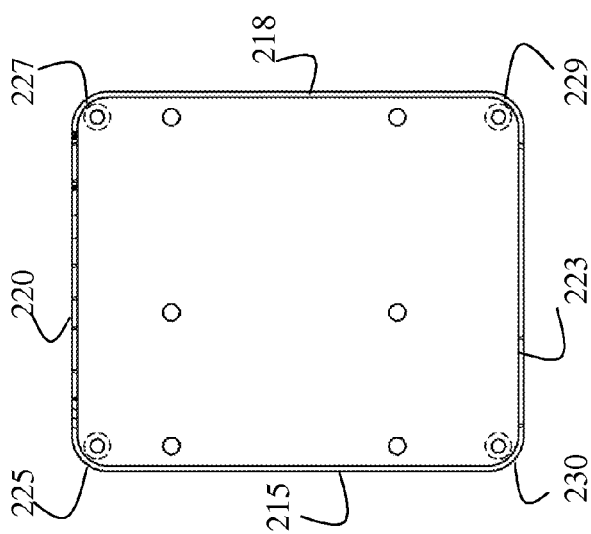
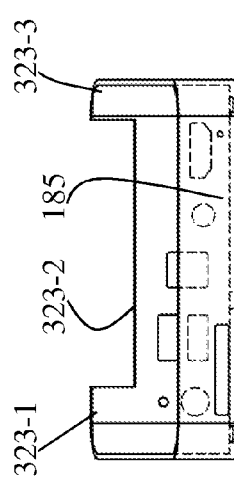

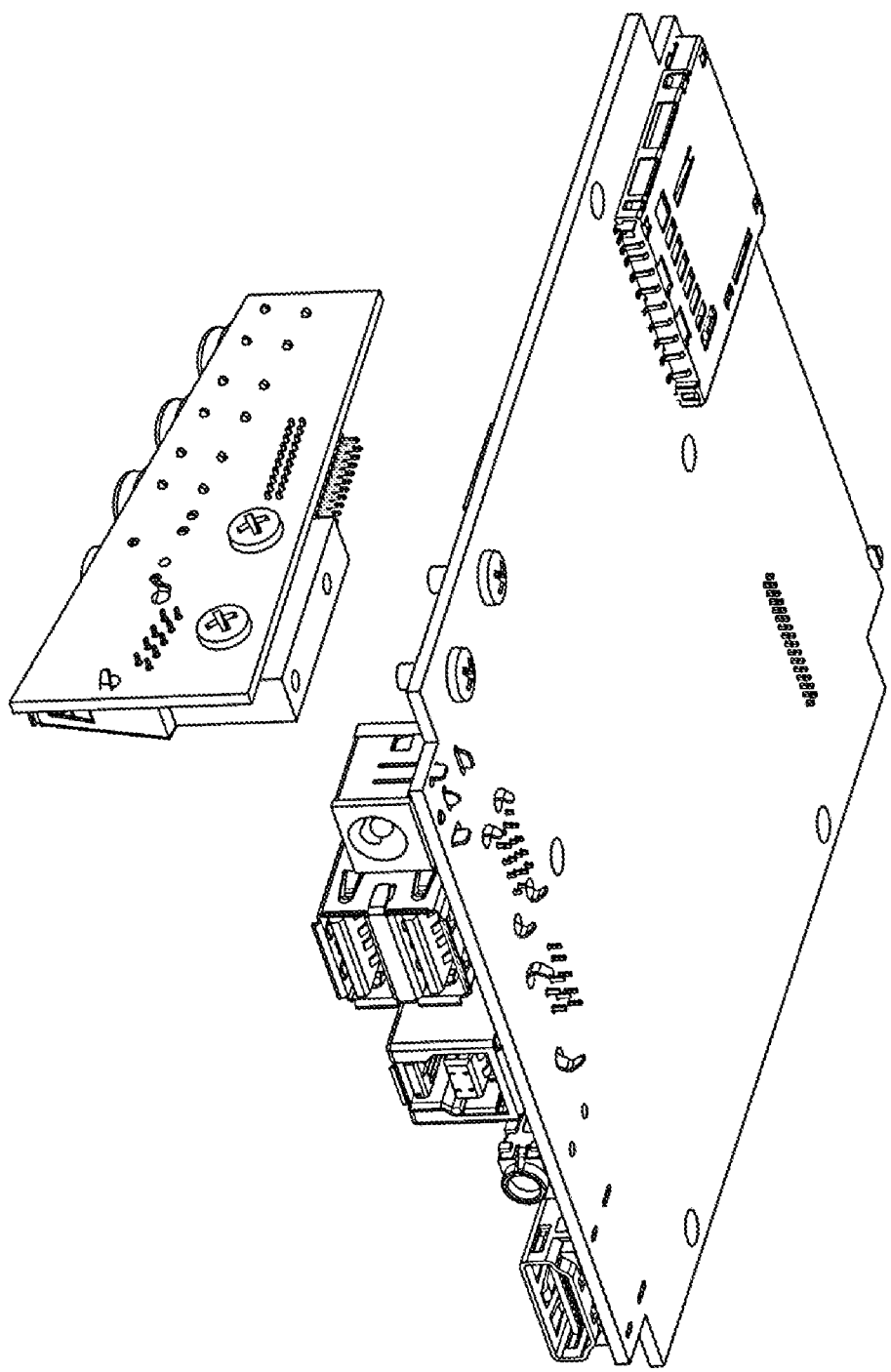

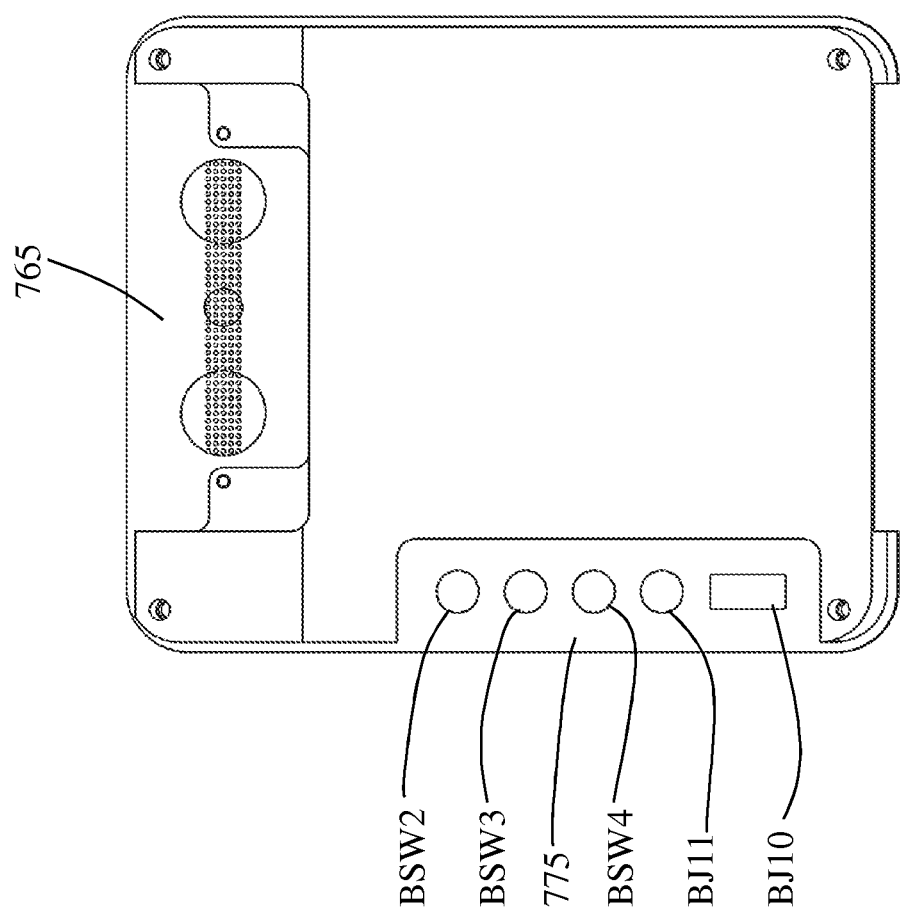

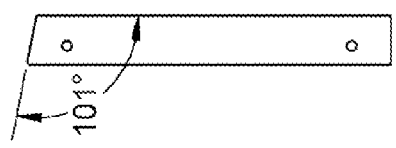
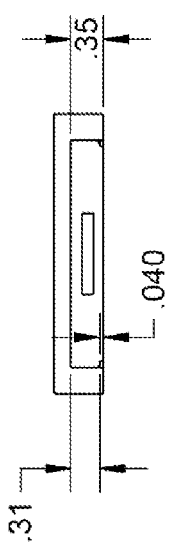
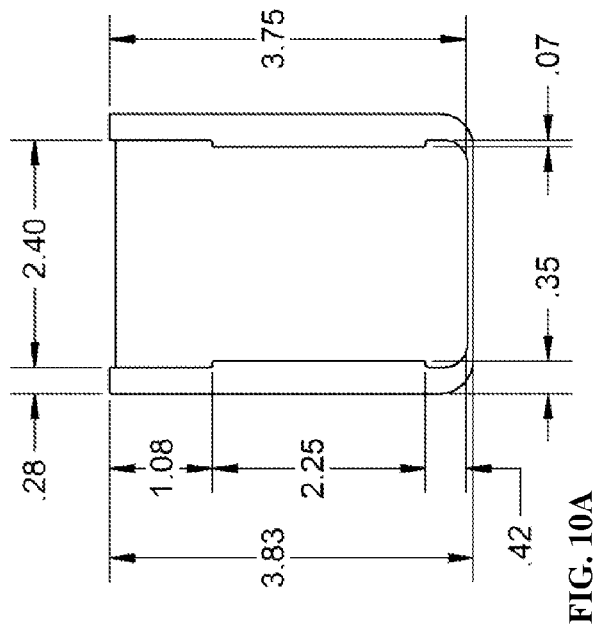
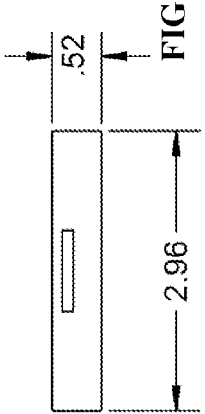
FIG. 10C
FIG. 10D
FIG. 10B
FIG. 10A

DOCK FOR PORTABLE ELECTRONIC DEVICES

CROSS-REFERENCE TO RELATED APPLICATIONS

This application claims priority to U.S. Provisional Application No. 61/530,939, filed Sep. 3, 2011, and the benefit of U.S. Provisional Application No. 61/611,572, filed Mar. 16, 2012, both of which are incorporated herein by reference.

TECHNICAL FIELD

This document generally relates to docking stations for portable electronic devices, such as mobile phones, mobile computers, and/or other hand-held computing, communication, and/or data enabled devices.

BACKGROUND

Portable computing devices, such as cell phones and/or data enabled portable electronic communication devices (e.g., smartphones), are commonly used today. In the last decade, such devices have found widespread acceptance for personal and business use. Some of the latest advances have resulted in such devices including computation/graphics intensive functionality that rivals the functionality of personal computers (PCs) and similar electronic devices. Docking stations have been developed to interface with portable computing devices through one or more physical connections with portable computing devices.

SUMMARY

This document generally describes docking stations for portable computing devices with one or more of a variety of features, such as a near horizontal tray into which a portable computing device can be placed (e.g., a tray with an angle between 5-25 degrees from horizontal), embedded microphones and/or speakers, and/or input jacks for external microphones and/or speakers. Additional and/or alternative features are described below.

Various implementations can provide one or more advantages. For example, the disclosed docking stations can allow users to more readily use and interact with portable computing devices that have been placed into ("docked") trays of the docking stations. Portable computing devices are generally designed for manual operation while being grasped by the user. However, portable computing devices are frequently placed in mechanical and/or electrical engagement with other compatible electronic devices and apparatus for charging the portable computing device, exchanging data, and/or otherwise supplementing the operation of the portable computing device. In many such instances, the external apparatus can significantly restrict or constrain the portability of the portable computing device. For example, the mobile computing device may be tethered to a wall socket for re-charging, physically connected to or disposed in substantial proximity to a stationary system such as a desktop computer, an entertainment system, and/or game console to allow interaction between the mobile computing device and these peripheral systems. In other instances, it may be desirable to operate the mobile computing device in a substantially hands-free manner such as while driving an automobile, while in the shower, the kitchen or the workshop. In such situations, it can be advantageous for the portable computing device to be docked in a docking station in a manner that allows features of the portable computing device (e.g., touchscreen of the portable computing device, keyboard of the portable computing device) to be at a near horizontal angle so that users can view and/or provide input to the portable computing device while docked and interfaced with some other external devices. Such a configuration can allow users to retain the ability to operate the portable computing device in hands-free and/or externally supported modes of operation in substantially the same manner as when the device is handheld and in a mobile mode of operation.

The details of one or more implementations are set forth in the accompanying drawings and the description below. Other features, objects, and advantages will be apparent from the description and drawings, and from the claims.

BRIEF DESCRIPTIONS OF THE DRAWINGS

FIG. 1A depict an example docking station.

Figure 2A:
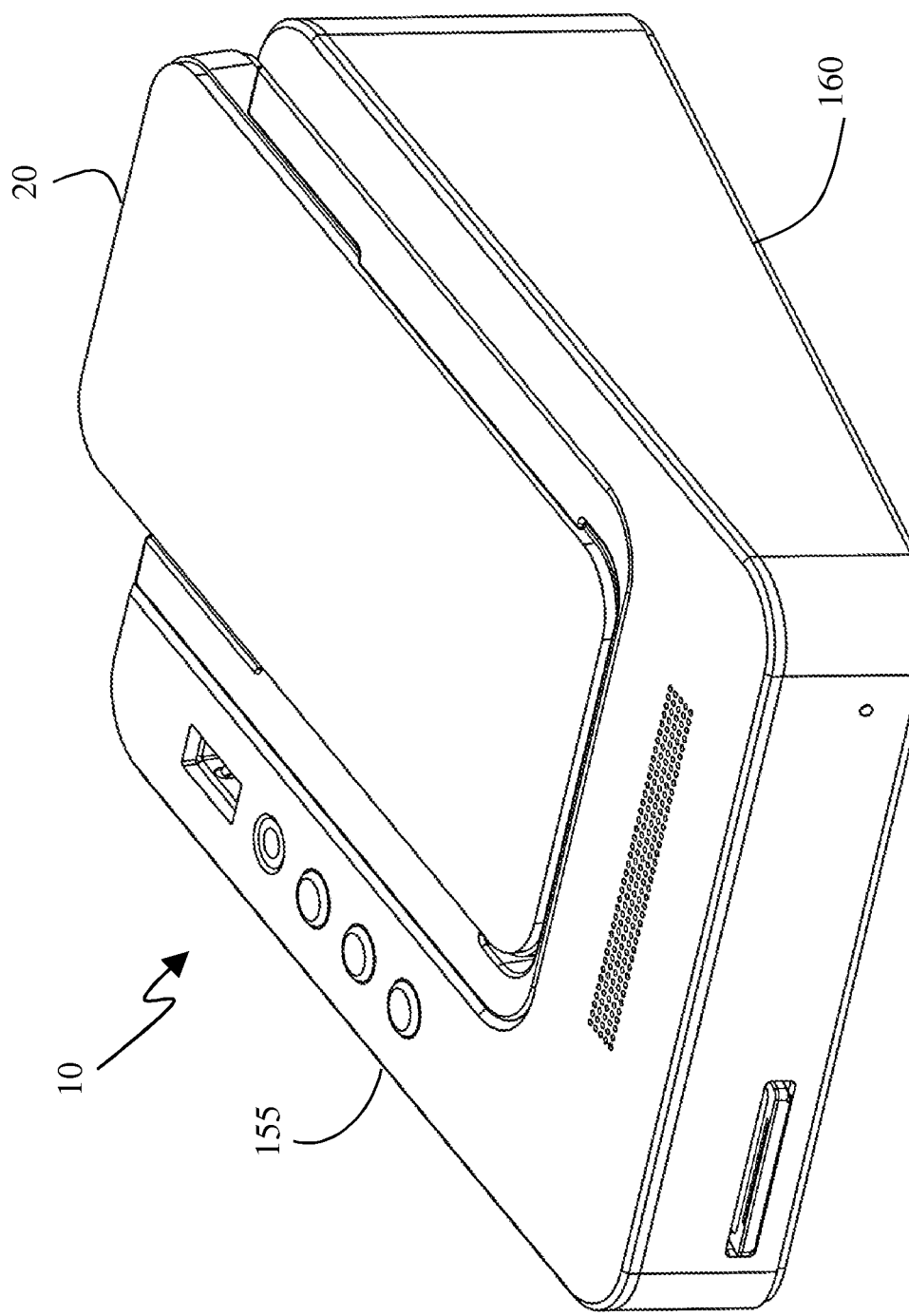
Figure 2B:
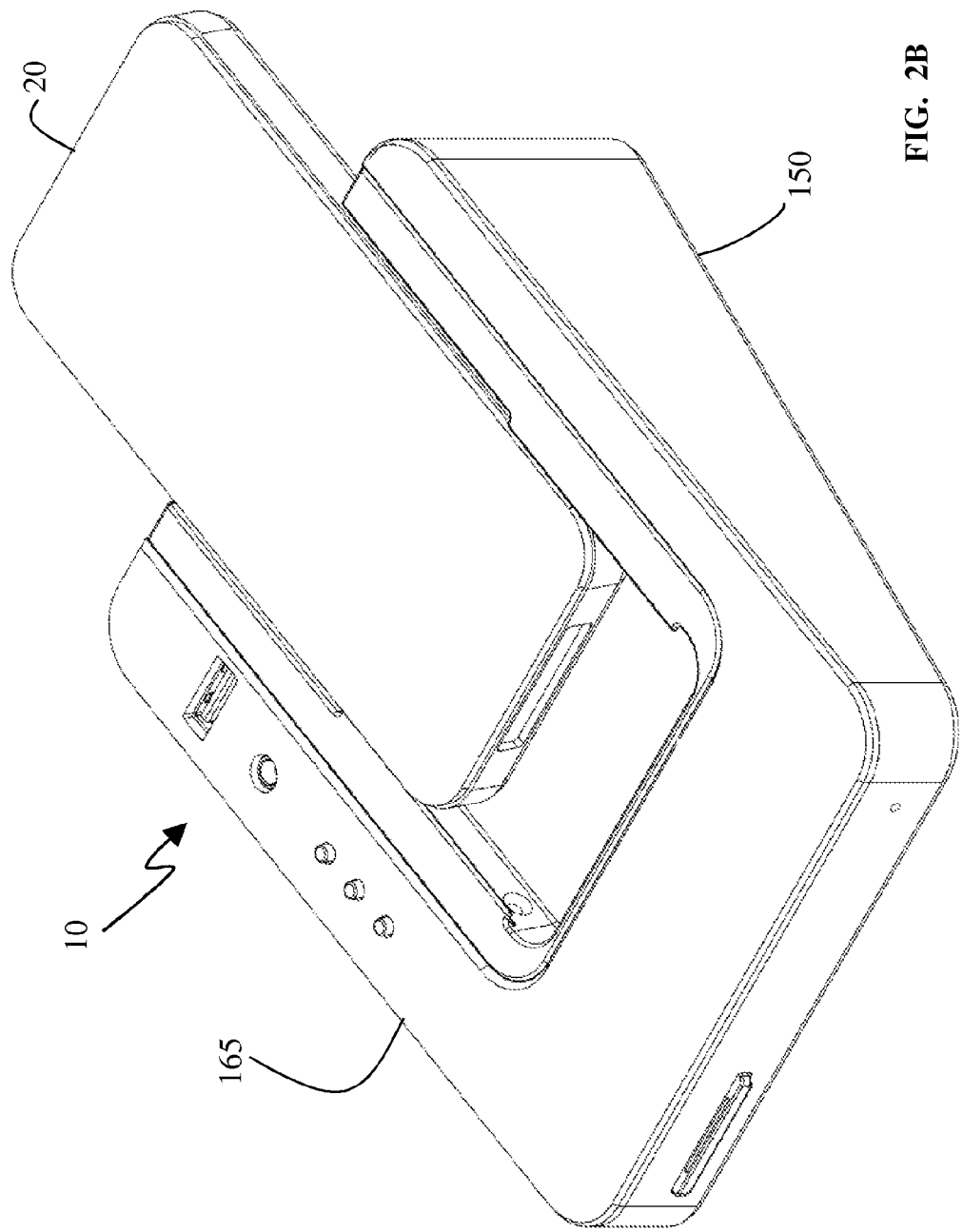
Figure 2C:
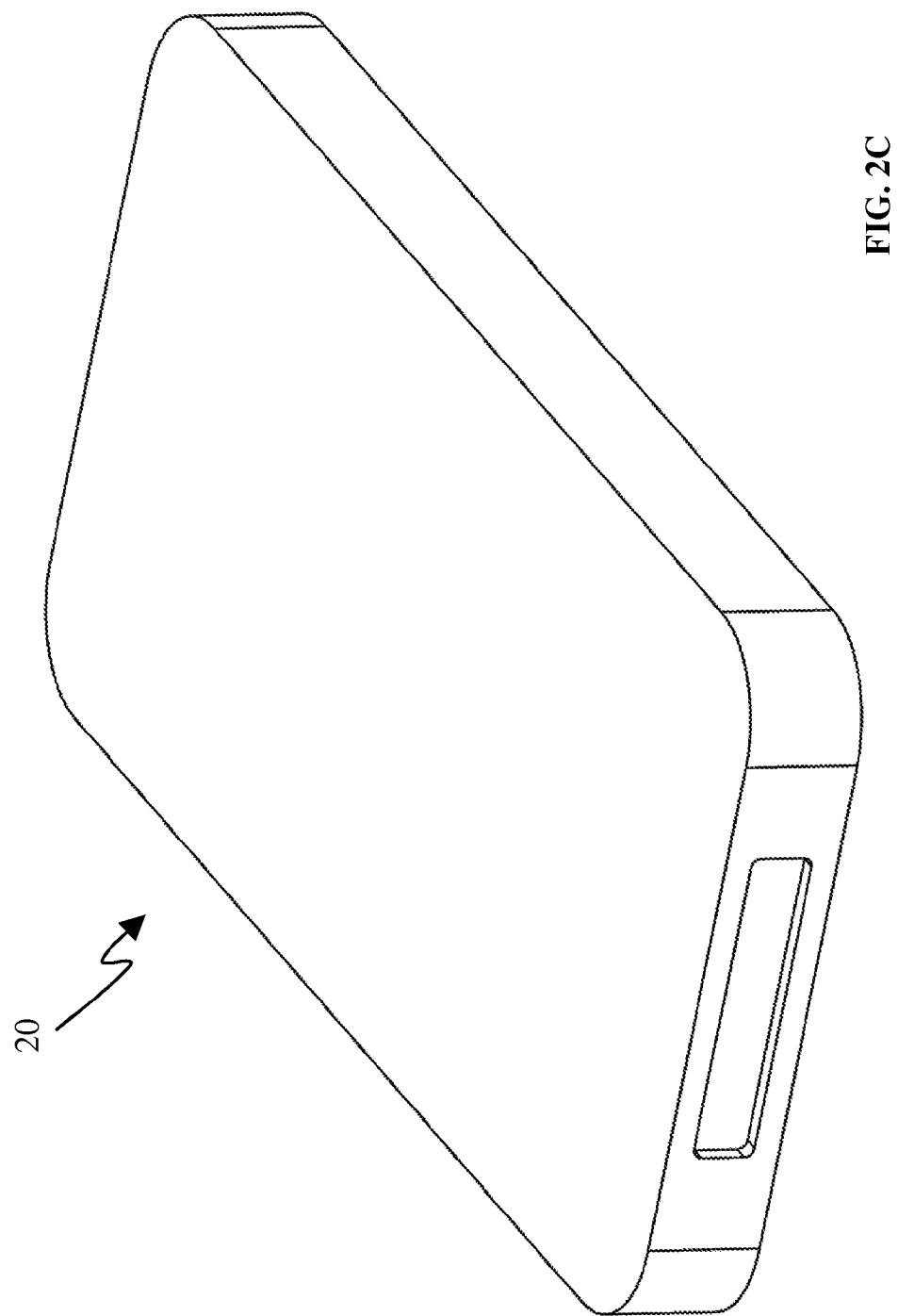

FIGS. 2A-C depict an example docking station and an example portable electronic device.

Figure 3:
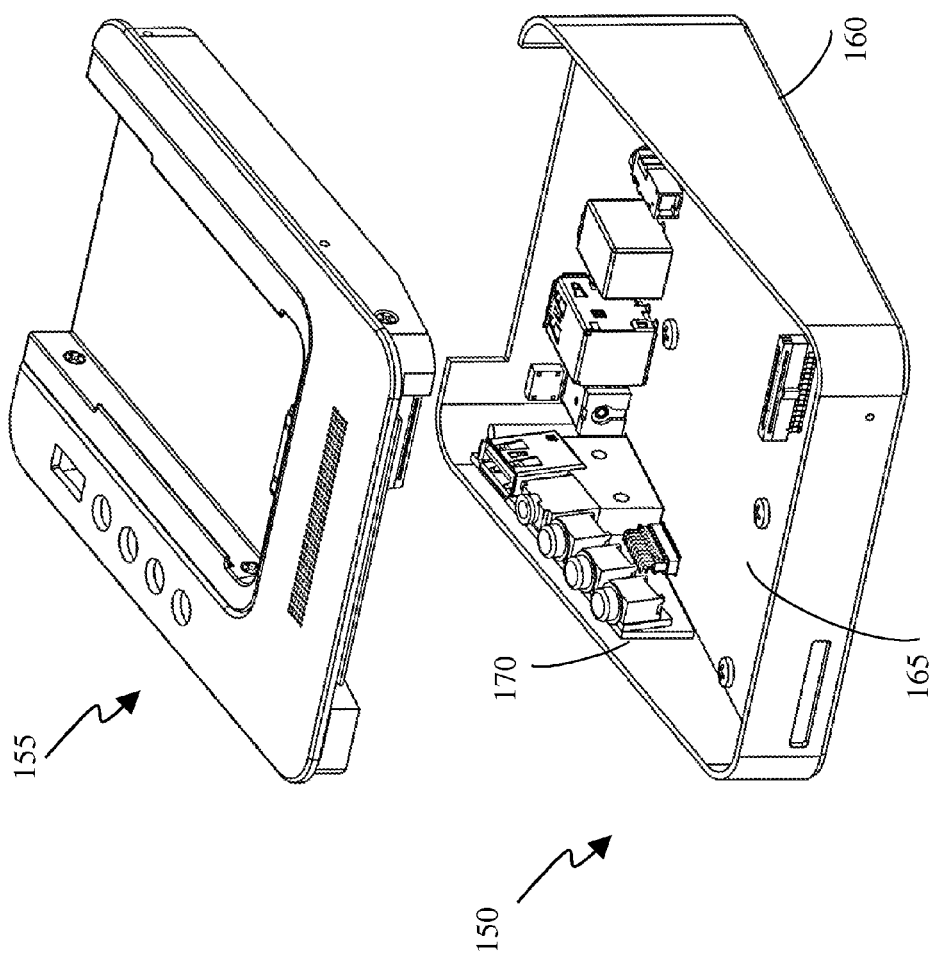

FIG. 3 is a front isometric view of an example dock base and dock cover.

FIGS. 4A-G depict an example dock base.

FIGS. 5A-I depict example components of a docking station.

Figure 6A:
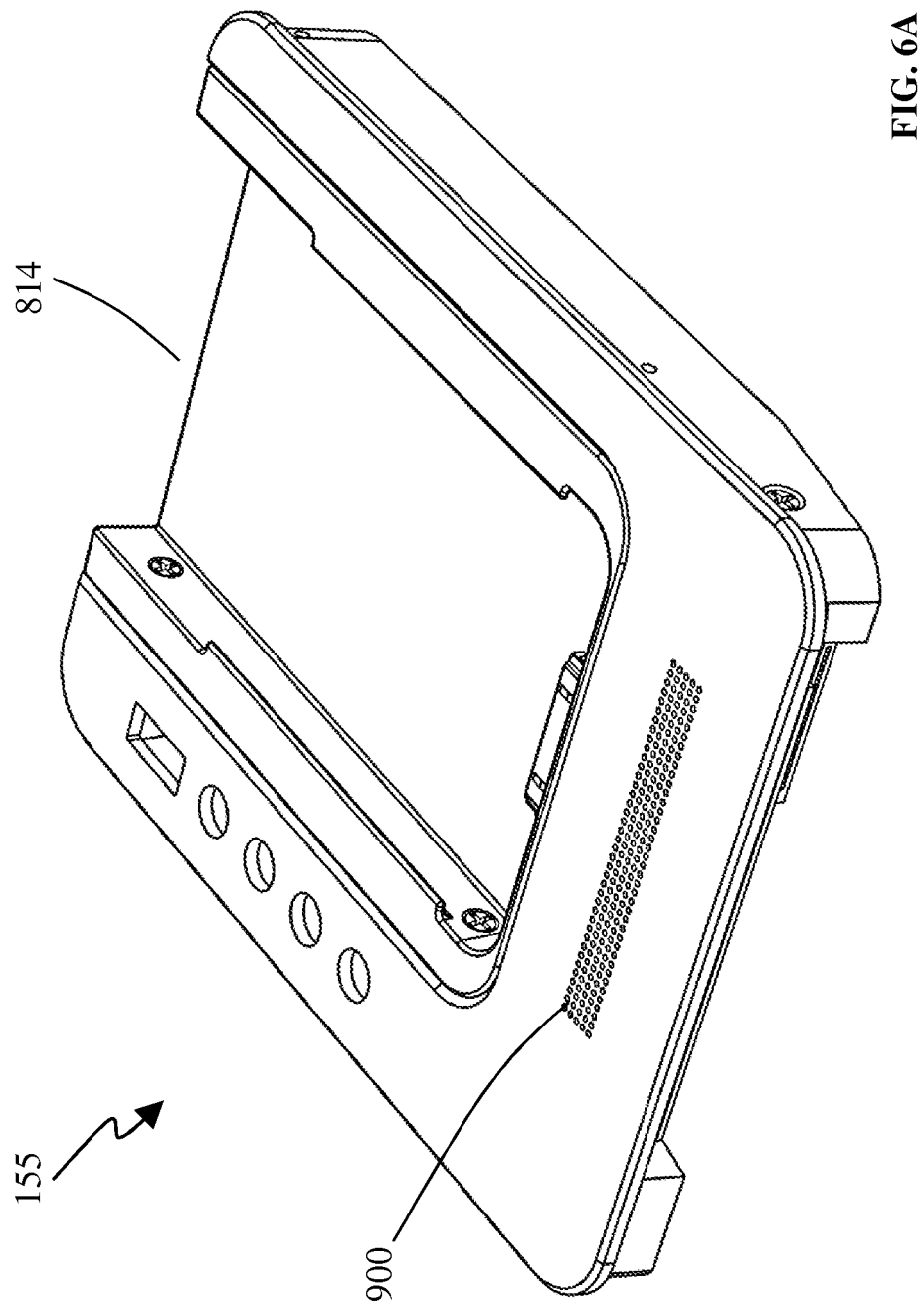
Figure 6B:
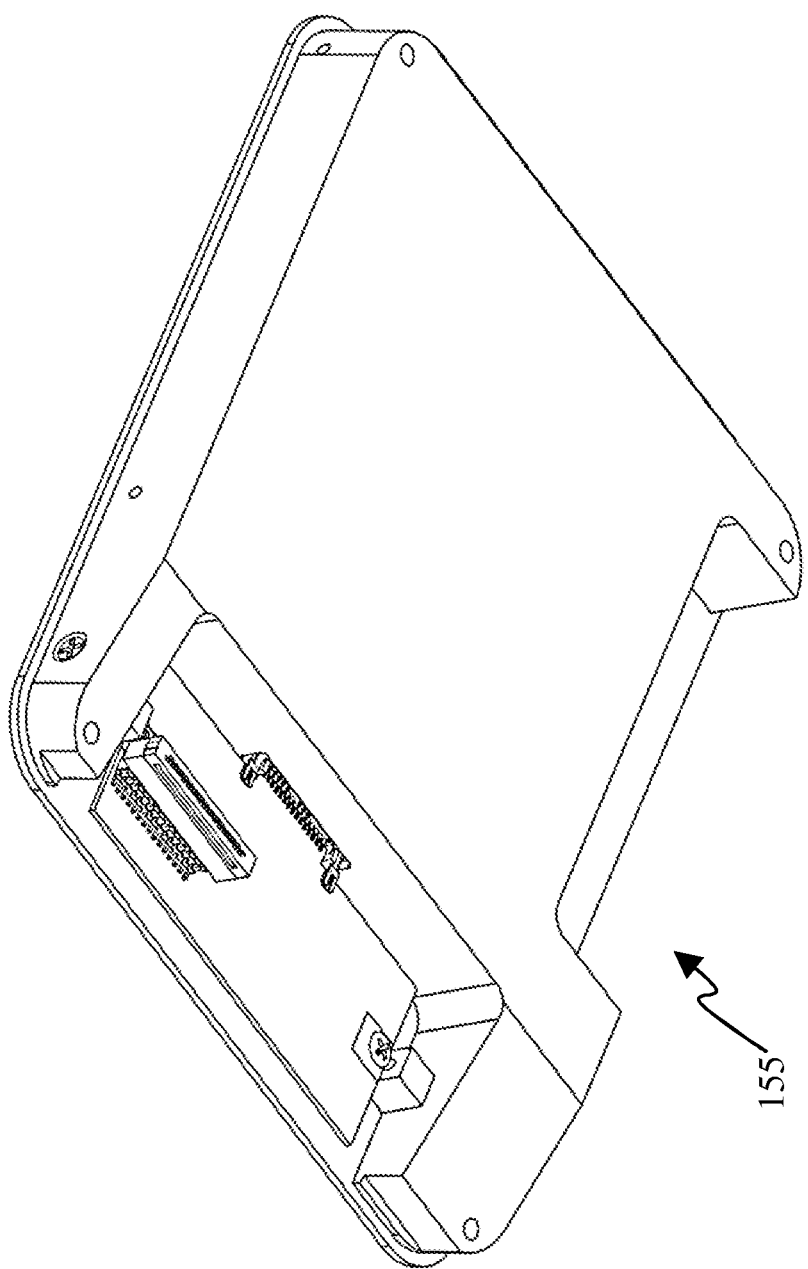
Figure 6C:
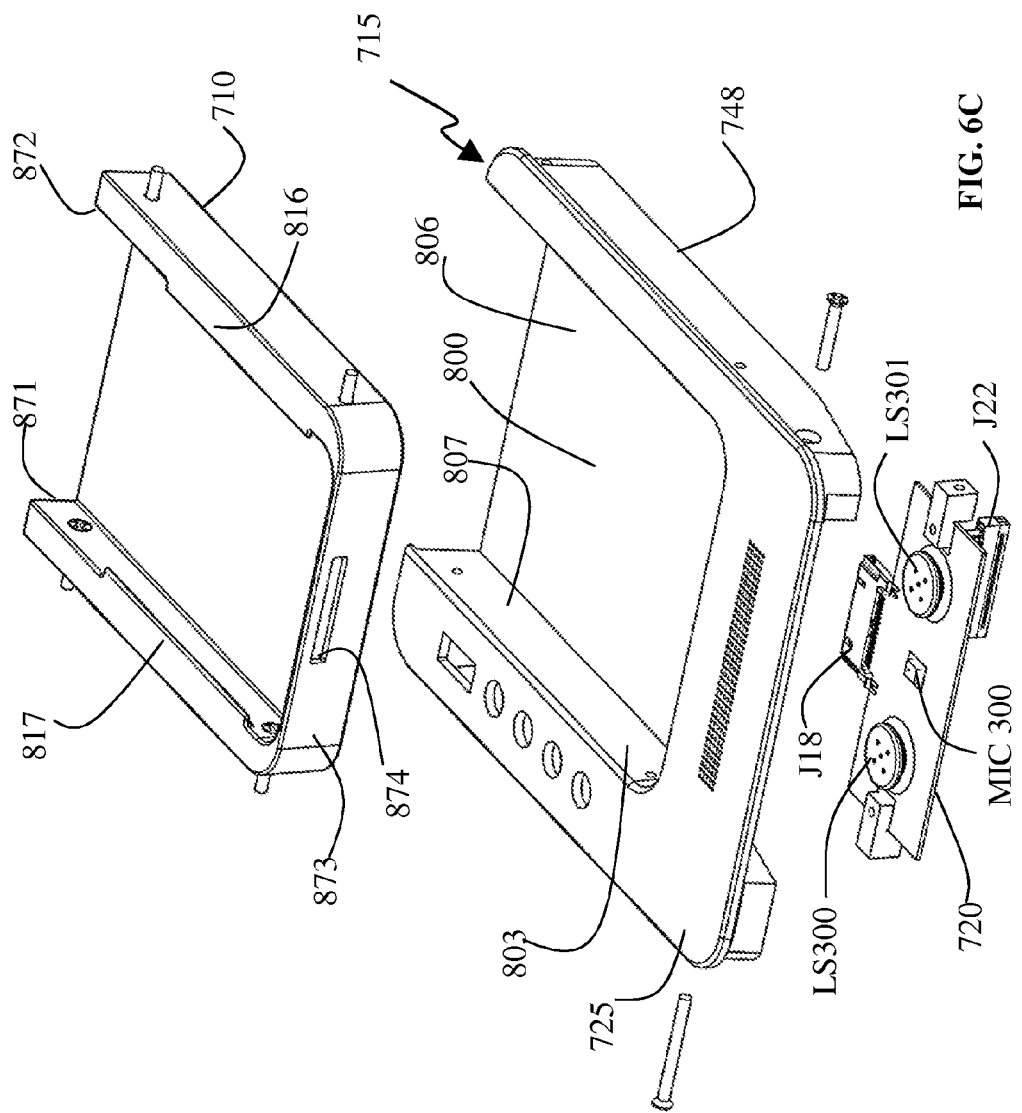
Figure 6D:
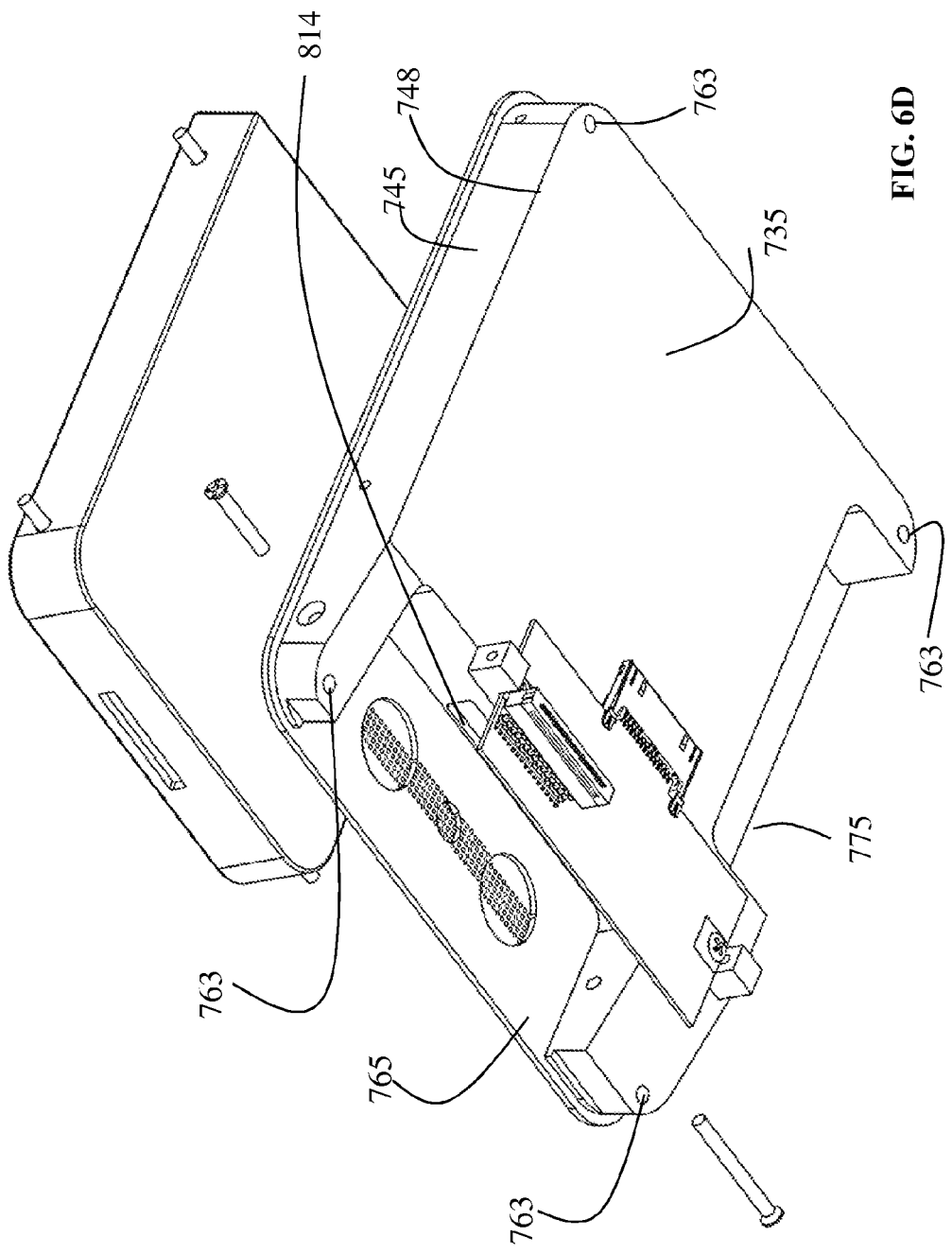
Figure 6G:
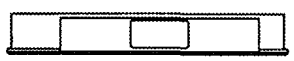
Figure 6E:
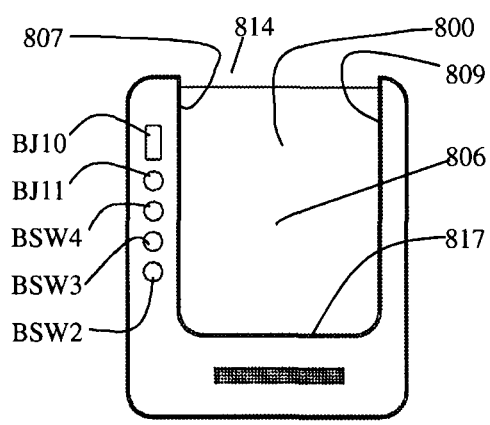
Figure 6F:
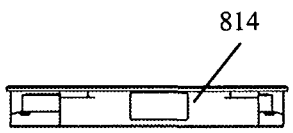
Figure 6H:
Figure 6J:
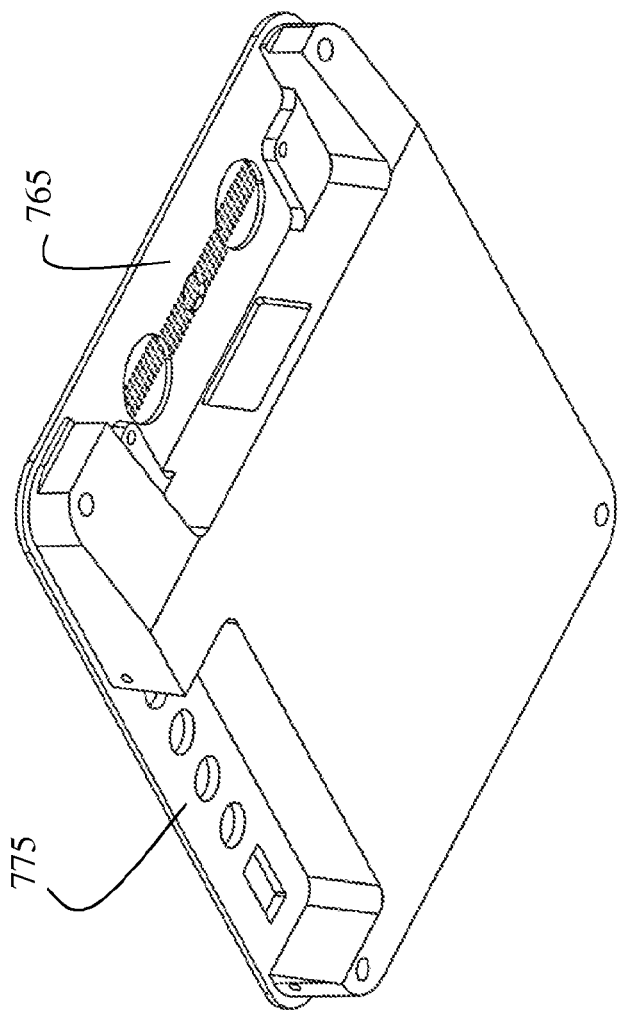
Figure 6K:
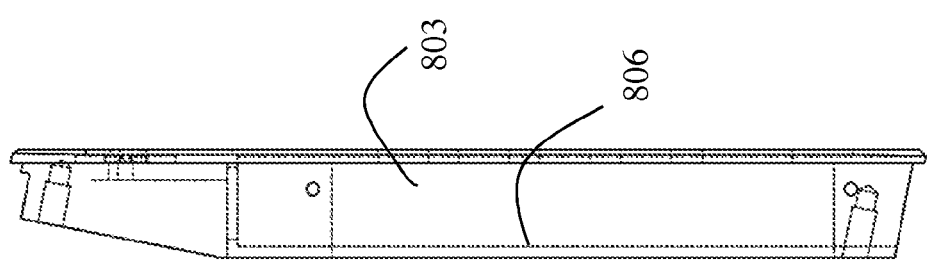
Figure 6L:
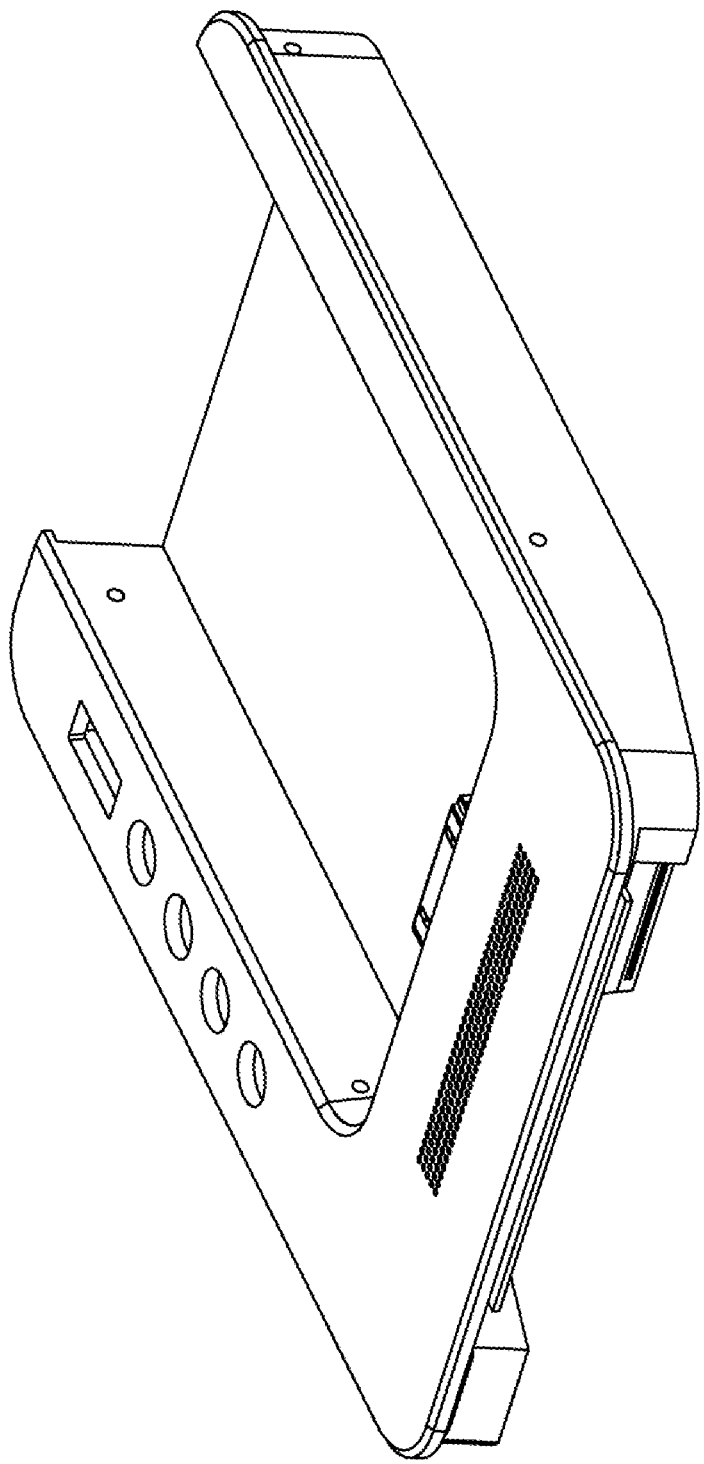
Figure 6M:
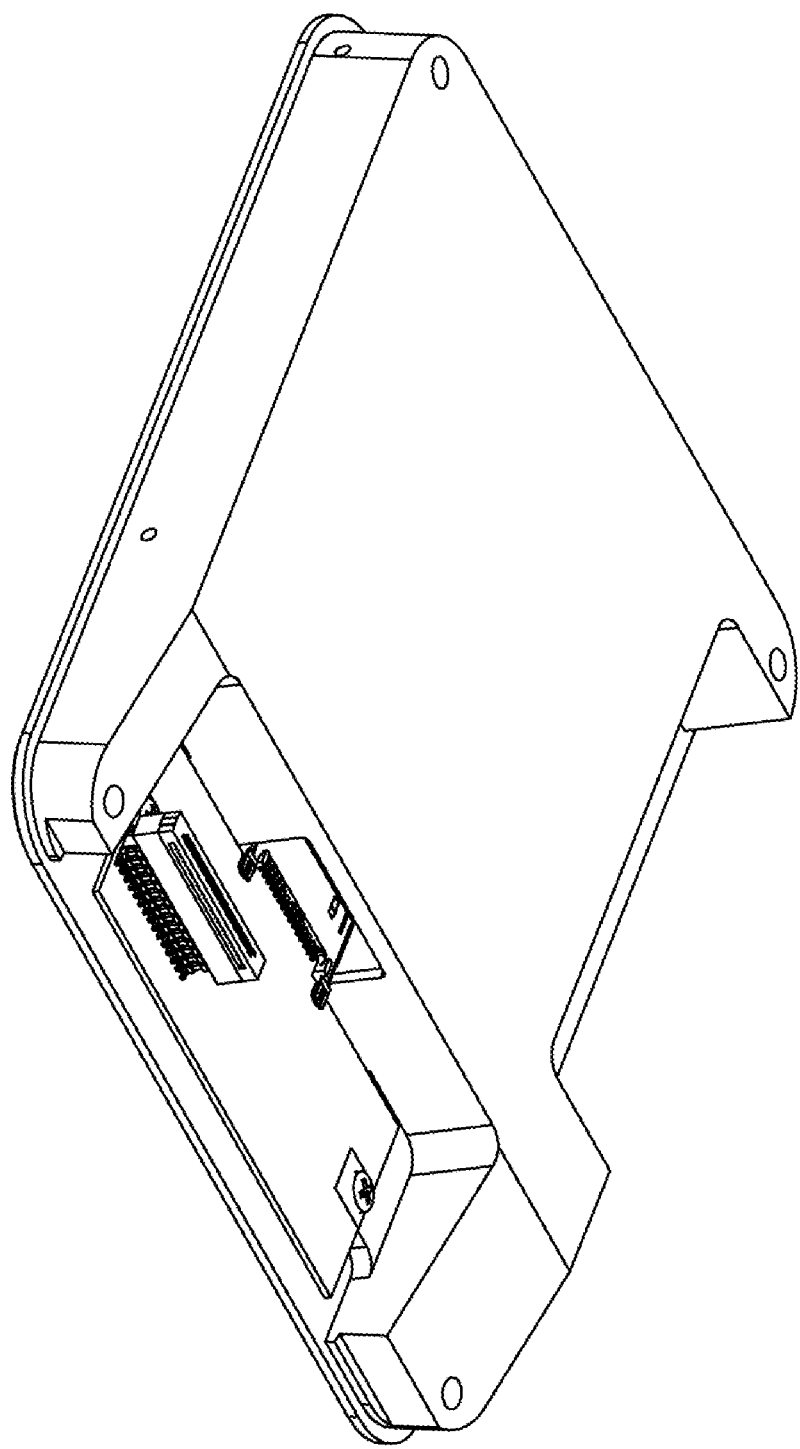
Figure 6N:
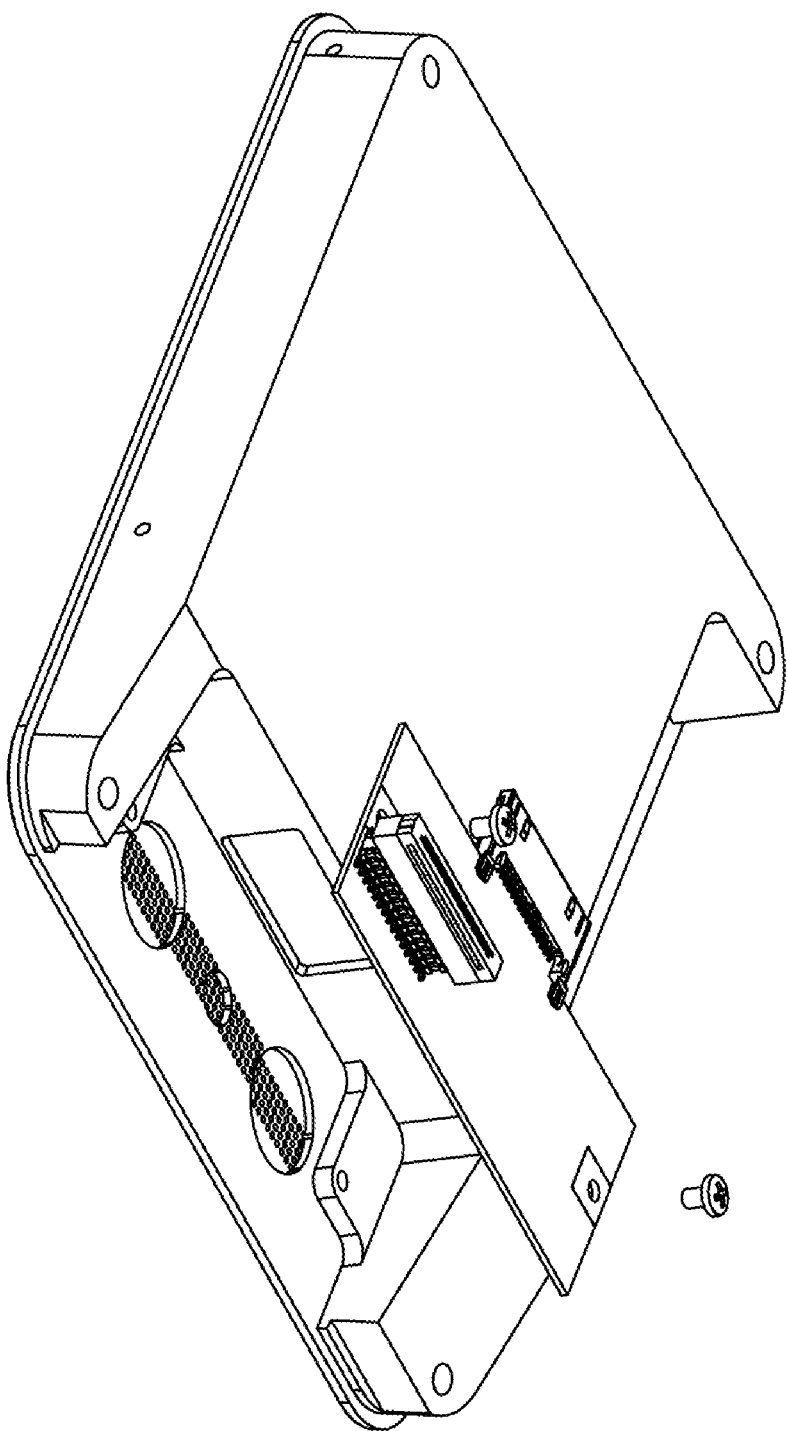
Figure 6O:
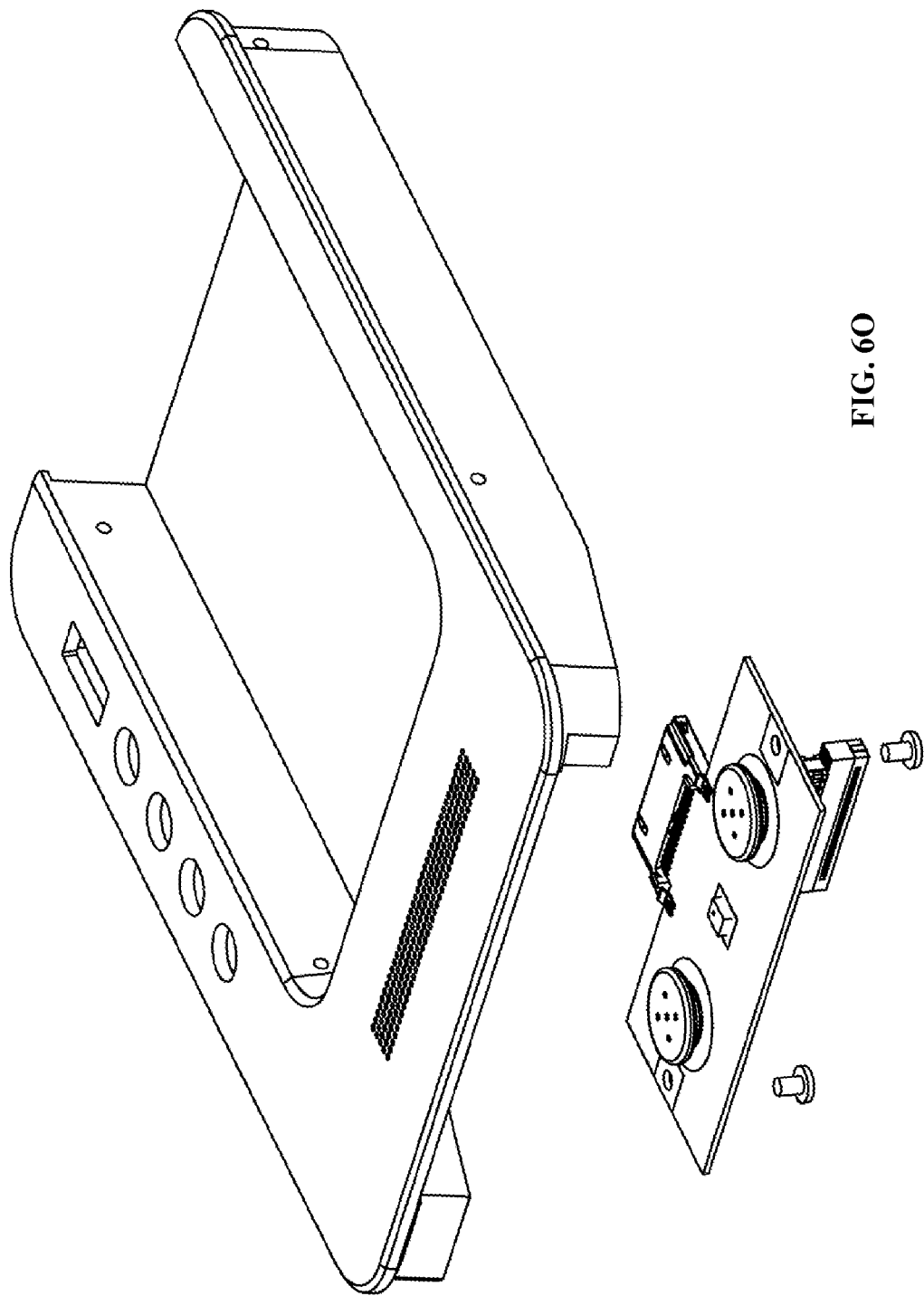
Figure 6P:
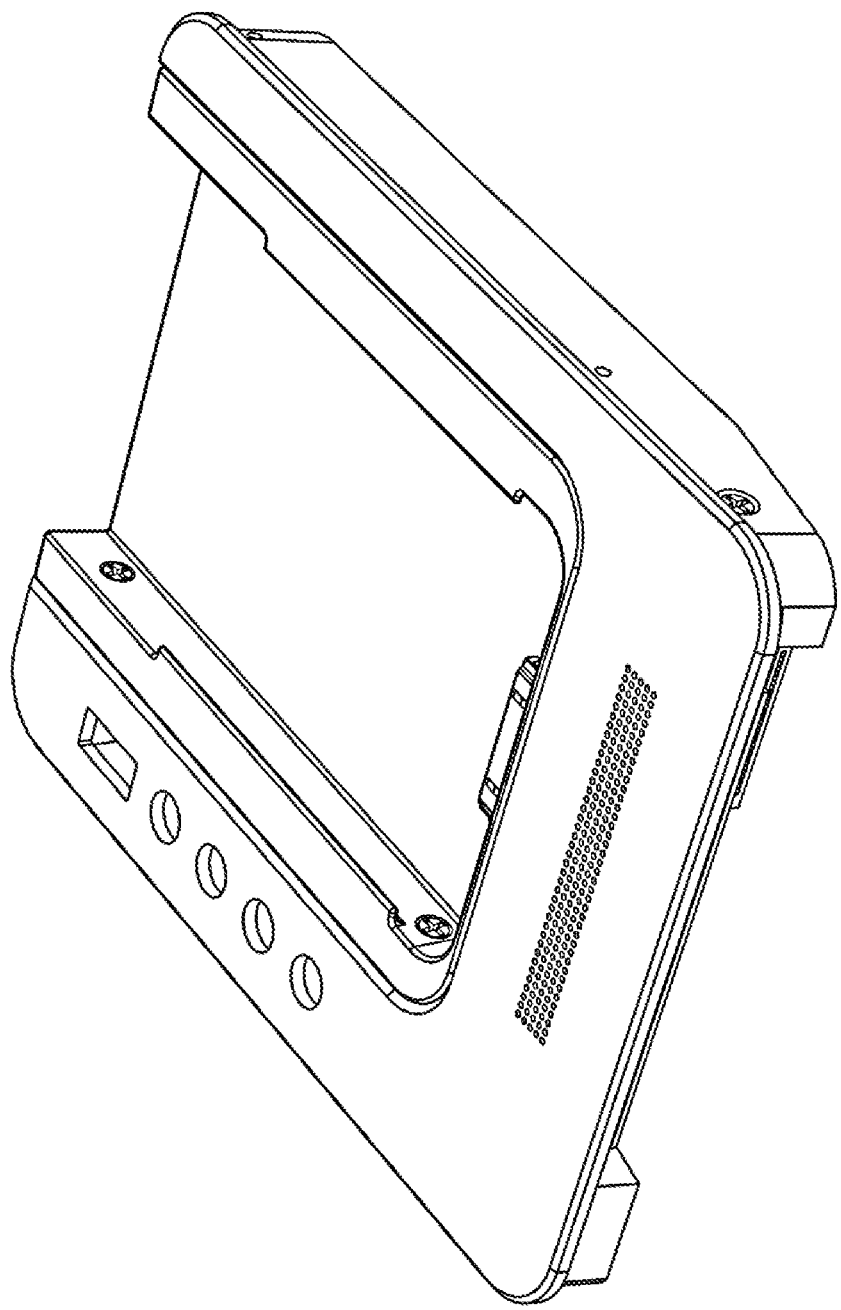
Figure 7A:
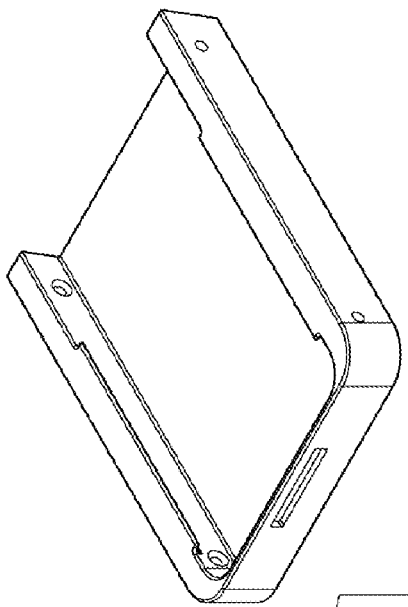
Figure 7E:
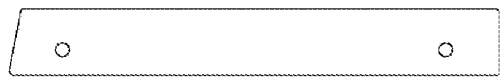
Figure 7D:
Figure 7B:
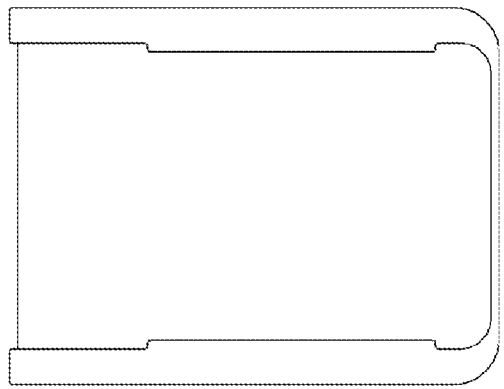
Figure 7C:

FIGS. 6A-P depict an example upper sub-assembly portion.

FIGS. 7A-E depict an example docking tray for a portable electronic device.

FIGS. 8A-D depict an example top cover.

Figure 9A:
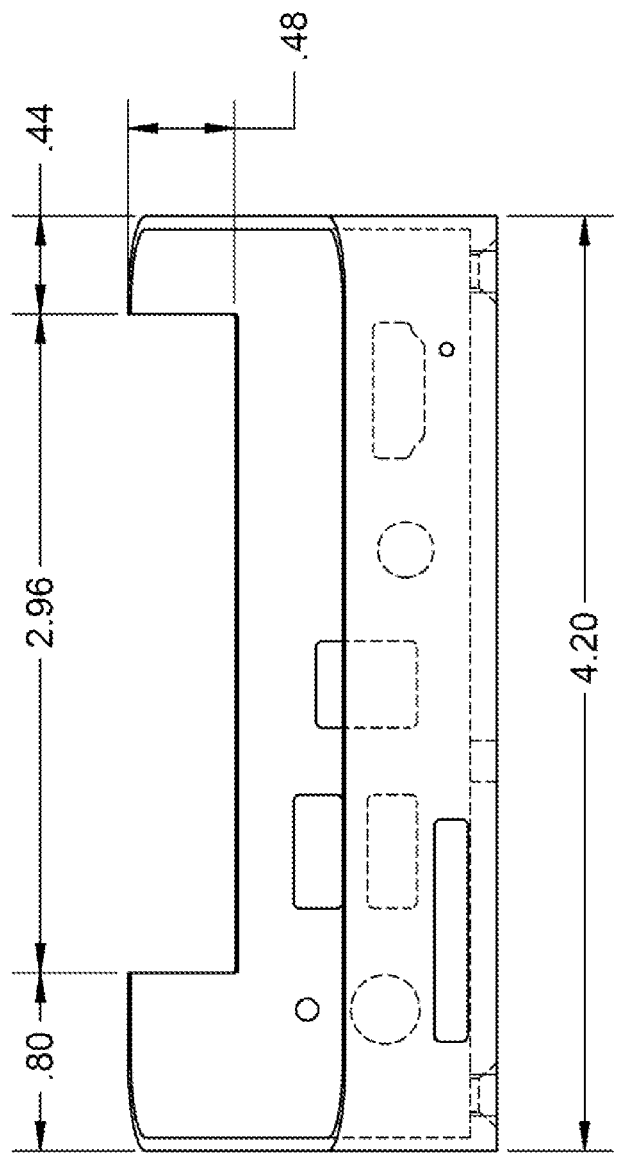
Figure 9B:
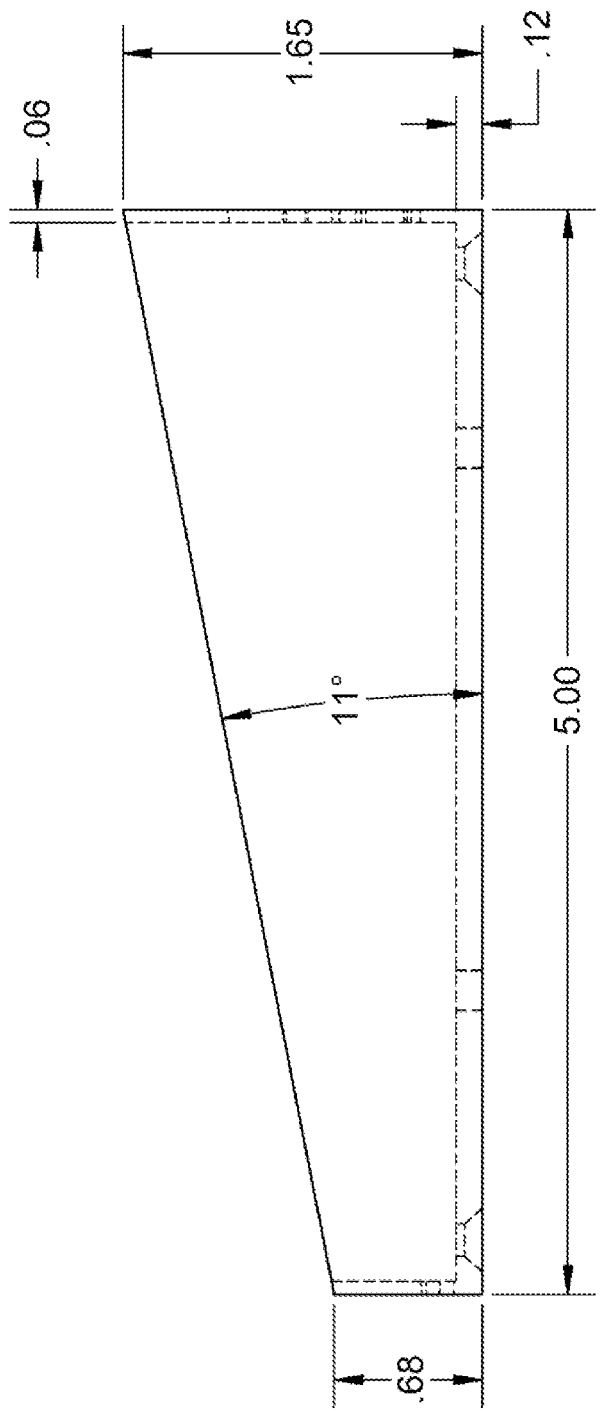

FIGS. 9A-B depict an example base housing.

FIGS. 10A-D depict an example adapter insert.

FIGS. 11 and 11A-E depict example circuitry.

DETAILED DESCRIPTION

FIGS. 1A-1E depict alternative views of an example docking station 10. FIG. 1A is a front isometric view of docking station 10. Directions of arrows 12, 13, and 14 in FIG. 1A represent directions "front", "right side" (lateral), and "top" respectively. Directionality descriptors "rear" (or "back"), "left side" (lateral), and "bottom" (not illustrated) refer to directions that are opposite the directions pointed to by arrows 12, 13 and 14, respectively. Depending on the orientation of the docking station with regard to the vantage point of the viewer, different directionality descriptors can be used to describe the docking station 10.

FIGS. 2A and 2B depict a front isometric view of the docking station 10 of FIG. 1A with an example portable electronic device 20 suitable for operation with the docking station 10. The portable electronic device 20 can be any of a variety of appropriate portable electronic devices, such as smartphones, cell phones, personal digital assistants (PDAs), and/or tablet computing devices. FIG. 2A depicts the portable electronic device 20 fully docked in the docking station 10 while FIG. 2B depicts the portable electronic device 20 partially supported but not fully docked within the same docking station. Docking station 10 is capable of mechanically receiving device 20, guiding it into detachable secured engagement and placing it into electrically connected relationship with a mechanical interface 30 of docking station circuitry so that the portable electronic device 20 is in a "fully docked" configuration wherein it is ready for being placed in operation with or is interoperating with the docking station 10 as will be described hereinafter. Mechanical interface 30 is depicted in the illustrations of FIG. 1A.

Besides securing and providing electrical connectivity, docking station 10 supports the portable electronic device 20 in an ergonomically near horizontal position (e.g., between 5-25 degrees from a plane on which the docking station 10 is sitting) that provides a user with a better viewing angle of the portable electronic device 20. This viewing angle can allow a user to access many of the features and functionality available in the normal hand-held mode of operation of the portable computing device 20, such as use of a touchscreen of the portable computing device 20. Docking station 10 also provides electrical connectivity to a power source as well as to other electronic devices and/or peripherals that enable normal charging and/or synching operations, extend and add to the features and functionality natively supplied on the portable electronic device 20.

Portable electronic devices 20 can include any of a variety of appropriate portable devices, such as mobile (including "smart") phones and multi-function devices exemplified by, for instance, the IPHONE, the IPOD, and the IPAD manufactured and sold by APPLE, Inc., SAMSUNG GALAXY® cell phones, BLACKBERRY® smartphones, portable navigation units relying on the Global Positioning System (GPS) satellite data, portable media players, tablet computers, personal digital assistants (PDAs), video game players, hand-held computers, Internet appliances, electronic book readers as well as other portable devices. The portable electronic device 20 of the illustrations of FIGS. 2A and 2B may be a mobile telephone or a smart-phone sized for operation while cradled in the palm of a user's hand. Some or all of the electrical and mechanical components that singly or in combination provide the features and functionality of device 20 may be housed within or mounted on a substantially closed device housing 40. Some of the aforementioned electrical and mechanical components can include those that facilitate or enable a user's interaction with the device i.e. enable user input/output (I/O). Examples include buttons, key-structures, touch-sensitive surfaces, display-areas, switches and other such mechanical, electrical, or electro-mechanical actuation mechanisms some of which may be designed to trigger software that in turn implements an action. Likewise, device housing 40 may include apertures or openings that can facilitate I/O to or from device 10. For example, transparent windows can facilitate the passage of light to a camera sensor or emission of light from a light emitting diode (LED) mounted within the device housing enclosure or the transparent window can be a camera lens; grille openings located on the device housing above microphone, speaker and such other components supported within the device housing enclosure can facilitate the passage sound to or from the microphone and speakers; suitably shaped and sized apertures on the device housing can allow one or more connectors or ports disposed on the device housing or within the device housing enclosure to be mated with external, complementary connectors operably coupled to external peripheral devices which can facilitate the exchange of data and/or communication signals between the device and the external peripheral devices.

The example portable computing device 20 is housed in an enclosure that generally resembles a rectangular prism 40 with radiused corners, as depicted in the illustration of FIG. 2C.

The rectangular prism 40 is depicted as including a device housing enclosure 45 bounded by an upper exterior surface 50 circumscribed by a periphery 55, a lower exterior surface 60 circumscribed by a periphery 65 and a peripheral surface 70. Each periphery 55 (65) is generally rectangular in shape and characterized by a length dimension 75, a width dimension 80 and radiused corners 85. Upper exterior surface 50 is disposed opposite lower exterior surface 60 and spaced apart from it by a distance characterized by a height dimension 90. Peripheral surface 70 depends from periphery 65 and extends along the height dimension to periphery 55. The periphery 55 (65) can have other types of polygonal shapes.

Upper exterior surface 50 can include a display area portion, a touch-sensitive portion adapted to receive touch-based input as well as display information, physical and/or software-implemented, iconized touch-sensitive buttons and such other user-manipulated controls. Upper exterior surface 50 may also include a first transparent window 52 to allow light transmission to or from device housing enclosure 45.

Lower exterior surface 60 can be configured to be supported on the palm of a user's hand and overcome slippage from the user's grasp during hand-held operation such as where the user is performing touch-based actions on the user display surface 50. Lower exterior surface 60 may also include a second transparent window 62 to allow light transmission to or from device housing enclosure 45.

Peripheral surface 70 includes top surface portion 110 opposite bottom surface portion 115, and left-lateral surface portion 120 opposite right-lateral surface portion 125. Top surface portion 110 can include an opening defining a port 72 for a headset jack, and one or more buttons, switches or other user manipulable structures 77 attached to or extending from it. Left-lateral surface portion 120 and right-lateral surface portion 125 can be equipped with one or more buttons, switches or other user manipulable structures 83 attached to and flush with the surfaces or protruding outward and away from the surfaces and from device housing enclosure 45. In the depicted exemplary device 20, bottom surface portion 115 has grille openings for speakers and a microphone and is equipped with at least one opening 130 through which an electrical device connector 135 mounted within device housing enclosure 45 can be mechanically and electrically mated to a complementary external connector such as mechanical interface 30. Mobile device 20 can be charged or synched to an external device by appropriately connecting the electrical device connector 135 to a power source or an external device. In a specific implementation, device connector 135 may be a dock connector for the IPHONE 4S mobile phone manufactured by APPLE, Inc of Cupertino Calif.

Referring again to FIG. 1A, the docking station 10 includes a dock base 150 and a dock cover 155. FIG. 3 is an exploded front isometric view of docking station 10 depicting some components station 10. FIG. 3 is a front isometric view of dock base 150 and dock cover 155. As described more fully hereinafter, dock base 150 and dock cover 155 can be assembled into the docking station 10, as depicted in FIG. 1A and shown in exploded front isometric view in FIG. 3.

Figure 4A:
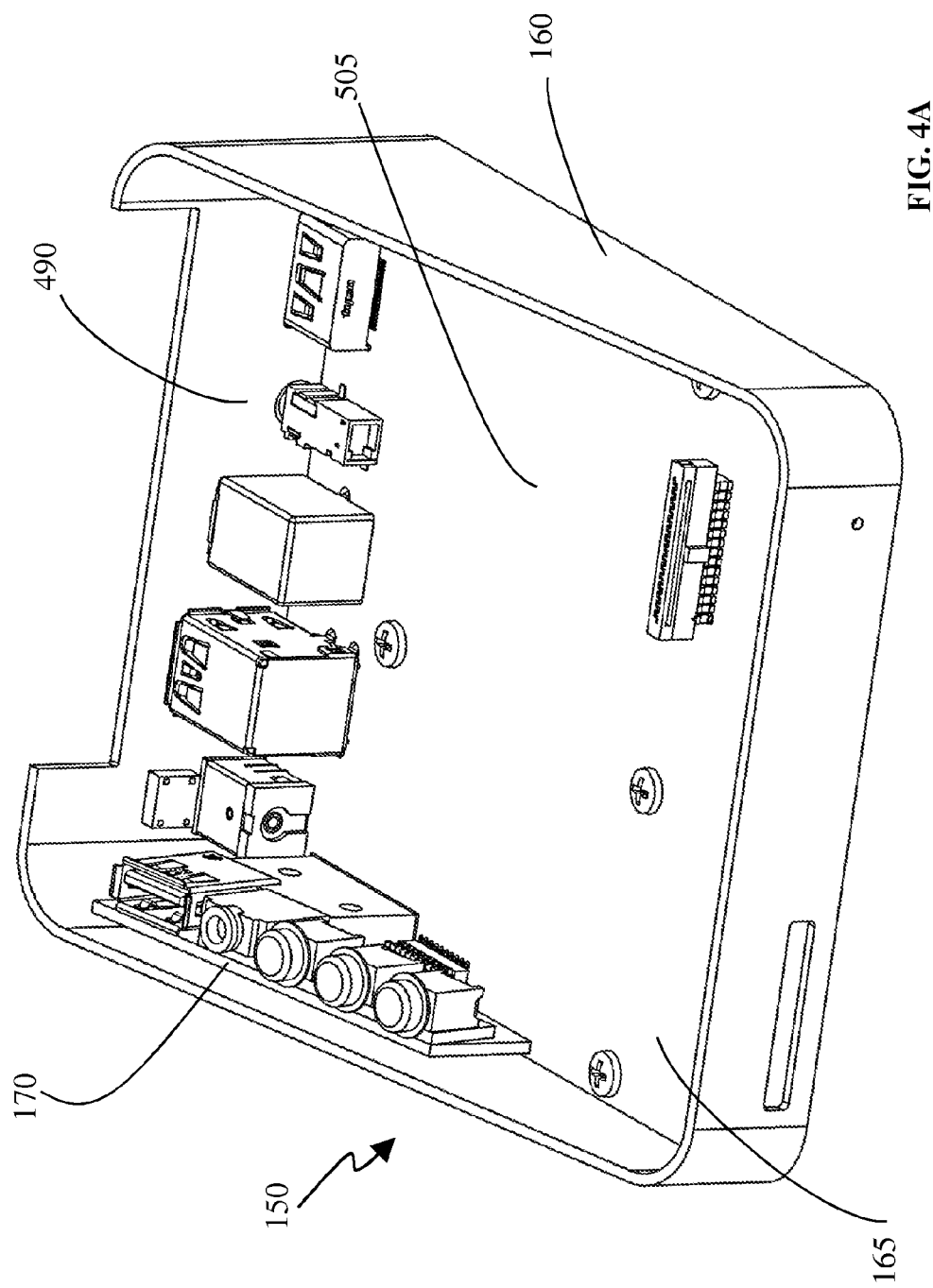
Figure 4B:
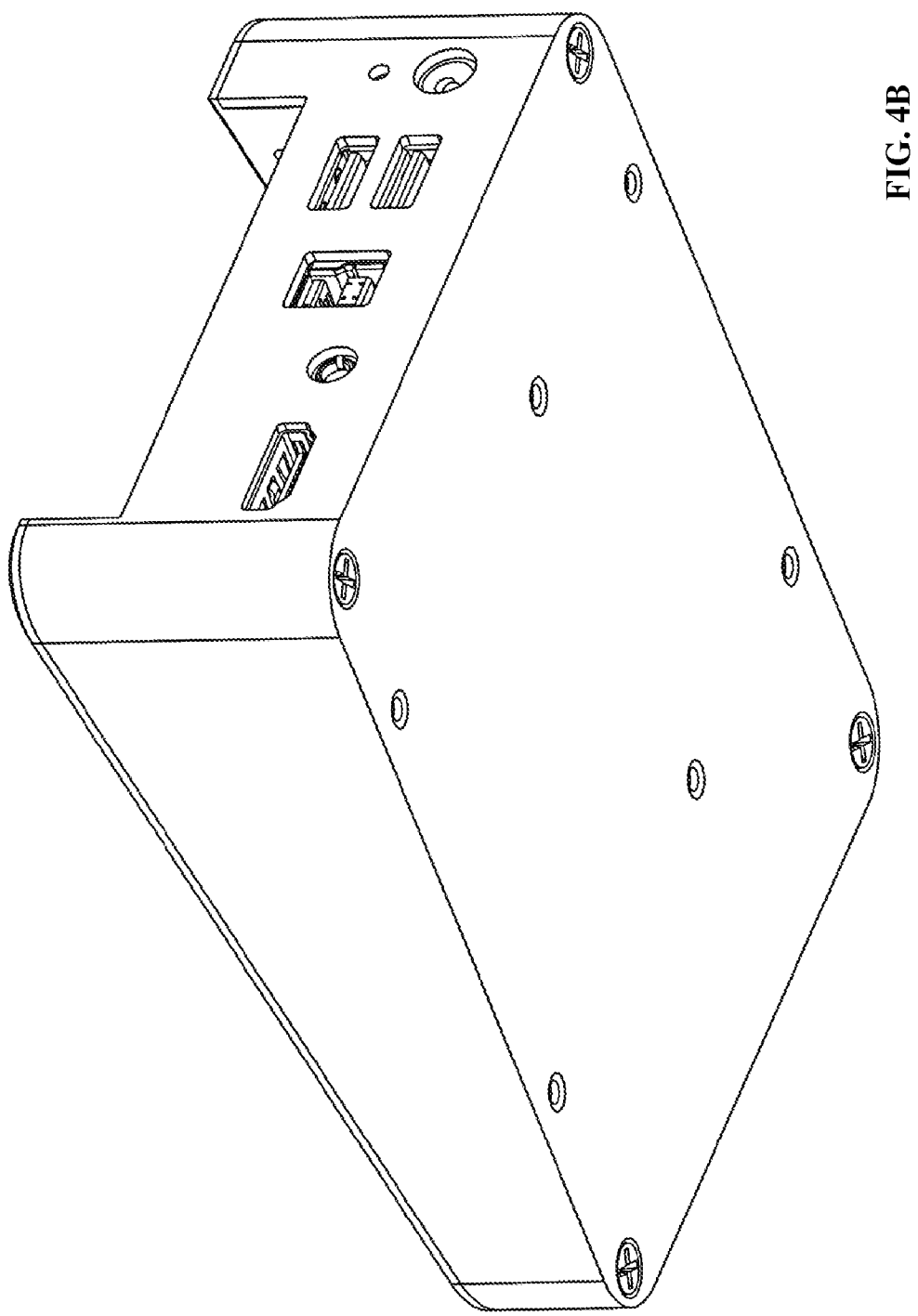

The specific structure of the dock base 150 and the dock cover 155 will now be examined in greater detail. FIGS. 4A-4G depict alternative views of dock base 150. FIG. 4A is a front isometric view dock base 150. FIG. 4B is a bottom isometric view of dock base 150. Dock base 150 includes a base housing 160 that houses dock circuitry and other componentry, main board 165, and I/O daughterboard 170. As more fully described hereinafter and depicted in FIG. 3, I/O daughterboard 170 can be urged into detachable electrical and mechanical connection with main board 165 and main board 165 can be reversibly fastened to base housing 160 so as to discourage relative movement between the base housing 160, main board 165, and I/O daughterboard 170 in the resulting assembled dock base 150.

FIGS. 4C and 4D illustrate respective front isometric and side isometric views of base housing 160. FIG. 4E is the bottom view of base housing 150. FIG. 4G and FIG. 4F illustrate respective front and right side views of base housing 150.

Referring now to FIGS. 4D-4F, base housing 150 includes a floor plate 175 and continuous peripheral sidewall 180. Floor plate 175 has an exterior surface 180 which operably contacts and supports docking station 10 on any suitable external surface 182 (not depicted) upon which the docking station 10 can be stably rested and operated. Exterior surface 180 may be contoured or otherwise adapted to conform to the surface geometry of any desired external surface 182, such as a table, desk, countertop, and/or floor surface.

Floor plate 175 also includes an interior surface 185 opposite exterior surface 180. Each first portion of interior surface 185 is oriented along a first direction 190 that is 180 degrees removed from the orientation of a corresponding first portion of exterior surface 180. Furthermore, each first portion of interior surface 185 is separated from each corresponding first portion of exterior surface 180 by a plate material thickness 195. In some implementations, such as those illustrated in FIGS. 4G and 4F, floor plate 175 is substantially planar and of a constant plate material thickness 195. Accordingly, in the some implementations, the interior surface 185 and exterior surface 180 can be both substantially flat and disposed substantially parallel to each other.

Outermost boundary of floor plate 175 defines a peripheral edge 200 characterized by at least one peripheral dimension 210 such as, for instance, a length of a segment of the peripheral edge 200. Peripheral edge 200 defines a shape of floor plate 175 that has a size defined by the at least one peripheral dimension 210. Floor plate 175 may have any suitable shape and is sized to ensure that docking station 10 can rest stably and be capable of being operated in a grasp-free mode when placed upon any suitable external surface 182 with the portable electronic device 20 docked within it. For example, floor plate 175 may be shaped in the form of a square, a trapezoid, a rectangle or other n-gon or even an ellipse or a circle.

In the illustrated embodiments, floor plate 175 has a generally rectangular shape with radiused corners as depicted in the illustration of FIG. 4E. Peripheral dimension 210-1, which represents a length of the rectangular shape, (without the radiused corners) defines respective first and third linear segments 215, 218 of peripheral edge 200 and is aligned with the direction of arrow 12 in the illustration of FIG. 1A. Peripheral dimension 210-2, which represents a width of the rectangular shape, (without the radiused corners) defines respective second and fourth linear segments 220, 223 of peripheral edge 200 and is aligned with the direction of arrow 13 in the illustration of FIG. 1A. As depicted in the illustration of FIG. 4E, linear segment pairs 215-220, 220-218, 218-223, and 223-215 are connected and blended at radiused corners that define respective first, second, third and fourth arcuate segments 225, 227, 229 and 230 of peripheral edge 200. In some implementations, radiused corners have a radius of curvature 0.4375 inches.

Referring again to the illustrations of FIGS. 4D-4F, floor plate 175 is provided with a structure defining first and second aperture sets 240 and 250 respectively. First aperture set 240 includes four identical apertures, identified by reference numerals 245-1 thru 245-4, disposed proximate first, second, third and fourth arcuate segments 225, 227, 229 and 230 of peripheral edge 200 respectively. Second aperture set includes six identical apertures, identified by reference numerals 255-1 thru 255-6, arranged in a spatial pattern 260 on floor plate 175 as depicted in the illustration of FIG. 4E. Each of the apertures 245-1 thru 245-4 and 255-1 thru 255-6 extend through plate material thickness 195 placing exterior surface 180 in fluid communication with interior surface 185 as depicted in the illustrations of FIGS. 4G and 4F. As described in more detail hereinafter, apertures in the first aperture set 240 are adapted to receive and guide threaded fasteners into threaded engagement with complimentary apertures in dock cover 155 to cause dock base 150 to be removably secured to dock cover 155 during assembly of docking station 10. Each aperture in the second aperture set 250 is shaped and sized to receive and securely retain a first portion of a standoff 265 with a friction fit while a second portion of the standoff is simultaneously placed in abutting relationship with the interior surface 185. As detailed elsewhere in the description, standoffs 265 are operative for removably mounting main board 165 within dock housing 150.

Referring again to FIGS. 4C and 4D, base housing 150 includes a continuous peripheral sidewall 180 which depends from peripheral edge 200. Continuous peripheral sidewall 180 has an inner peripheral surface 182 that is proximate the interior surface 185 spaced apart by wall thickness 183 from an outer peripheral surface 184 which is the flip side of inner peripheral surface 192. As depicted in the illustrated embodiment of FIG. 4C, peripheral sidewall 180 extends outwardly from interior surface 185 and away from exterior surface 180 in the direction of arrow 14 to terminate in a continuous peripheral wall edge 280. In the specific embodiments illustrated in FIGS. 4C and 4D, peripheral sidewall 180 generally follows the contour of the peripheral edge 200 and includes opposing base front and base rear side walls 310, 320, opposing base right lateral and base left lateral side walls 330, 340, and base arcuate side walls 345, 347, 348, and 350. Base front side wall 310, base rear side wall 320, base left lateral side wall 330 and base right lateral side wall 340 extend from respective second, fourth, first and third linear segments 220, 223, 215, 218 of peripheral edge 200 to terminate at respective upper linear edges 313, 323, 333, and 345. Furthermore, first, second, third and fourth base arcuate side walls 345, 347, 348, and 350 extend from first, second, third and fourth arcuate segments 225, 227, 229 and 230 of peripheral edge 200 to terminate at respective upper curvilinear edges 355, 357, 358 and 360. First, second, third and fourth base arcuate side walls 345, 347, 348, and 350 join and blend base side wall pairs 330-310, 310-340, 340-320, and 320-330 into a continuous peripheral sidewall 180 that terminates at a continuous peripheral wall edge 280 located distally from interior surface 185. Continuous peripheral wall edge 280 is defined by segments including upper linear edges 313, 323, 333, and 345 interconnected by upper curvilinear edges 355, 357, 358 and 360 as depicted in FIG. 4C.

FIGS. 4C, 4D, 4F and 4G illustrate peripheral dimensions of continuous peripheral side wall 180. In the illustrated embodiments, floor plate 175 is substantially planar and so are the exterior and interior surfaces 180, 185. For ease of description, the docking station 10 is presumed to be resting on a substantially planar surface which is in contact with substantially the entire exterior surface 180. In this configuration of the docking station, as depicted in FIG. 4C, continuous peripheral sidewall 180 is generally vertical—in that it extends along direction arrow 14. With the continuous peripheral sidewall 180 disposed vertically, each portion of peripheral wall edge 280 can be associated with its vertical height above exterior surface 180. Vertical heights define a shape of the continuous peripheral sidewall 180. In some implementations, base housing 150 is a single integral unit in that it is machined from a single block of material such as aluminum, steel, wood or a custom material. In other implementations, base housing 150 may be constructed as a single unit by injection molding or some other thermo-forming process from a polymer component such as polycarbonate, ABS and so forth.

Referring to FIG. 4C, the upper linear edge 313 of base front side wall 310 can be located at a first vertical height 410 above exterior surface 180. Base front side wall 310 is rectangular with a length dimension defined by second linear segment 220 of peripheral edge 200 and a width dimension defined by first vertical height 410.

Base rear side wall 320 is bounded between fourth linear segment 223 of peripheral edge 200, upper linear edge 323 and a second vertical height 420 of upper linear edge 323 from exterior surface 180. Upper linear edge 323 has three segments 323-1, 323-2, 323-3 having linear extents UL1, UL2, and UL3 respectively. Segments 323-1 and 323-2 are located at the same second vertical height 425 from exterior surface 180. Segment 323-2 is located at a third vertical height 430 from exterior surface 180. Third vertical height 430 is smaller than second vertical height 425 by a height difference 435. Base rear side wall 320 includes three rectangular areas; the first rectangular areas is defined by a length UL1 and a width defined by second vertical height 425; the second rectangular area is defined by a length UL2 and width defined by third vertical height 430; and the third rectangular area is defined by a length UL3 and width defined by second vertical height 425. In effect, base rear side wall 320 can be envisaged as a rectangle of length defined by fourth linear segment 223 of peripheral edge 200 and width defined by second vertical height 425 but with a "U" shaped cut-out 440 at second segment 323-2. "U" shaped cut-out has a length dimension defined by linear extent UL2 of segment 323-2 and a depth dimension defined by the height difference 435.

Base right lateral and base left lateral side walls 330, 340 have the same trapezoidal shape in that respective upper linear edges 343, 333 taper continuously from a rear height 450 proximate base arcuate side walls 348, 350 at the rear of base housing 150 to a front height 455 proximate base arcuate side walls 347, 345 at the front of base housing 150 as depicted in FIGS. 4C and 4F. Upper linear edges 343, 333 subtend an angle 460 with respective third and first linear segments 218, 215. In effect, upper linear edges 343, 333 are inclined at an angle 460 with the exterior surface 180.

Base front side wall 310 is located at a first vertical height 410 above exterior surface 180. Base front side wall 310 is rectangular with a length dimension defined by second linear segment 220 of peripheral edge 200 and a width dimension defined by first vertical height 410.

Base front side wall 310 is provided with a structure defining a slot BJ16, and an aperture BD7. Slot BJ16 is shaped and sized to accommodate a SD card and provide access to a SD card connector on the docking station 10. Aperture BD7 is designed to allow light from a dock status indicator LED to shine through.

Base rear side wall 320 can be provided with a structure defining variously shaped and sized apertures BJ17, BJ12, BJ6, BJ8A, and BJ8B through which suitable external connectors may be mated with respective High Definition Media Interface (HDMI), speaker jack, Universal Serial Bus (USB) type B connector, and/or first and second USB type A stacked connectors provided in docking station 10. Additional and/or alternative structures on base rear side wall 320 can define openings BJ7 and Bsw1 respectively. Opening BJ7 provides access for an external power jack J7 to be connected to the docking station 10. Aperture sw1 provides access to a reset switch on docking station 10.

FIGS. 9A and 9B are respectively front and right side views of the example base housing 160. The base housing 160 can be dimensioned as depicted in the illustrations of FIGS. 9A, 9B.

Inner peripheral surface 182 of continuous peripheral sidewall 180 and the interior surface 185 define a cavity 490 suitable for housing the mechanical and electrical devices and components that cooperate to provide the features and functionality of docking station 10. The illustration of FIG. 4A depicts an example printed circuit board (PCB) assembly 505 that includes main board 165, and I/O daughterboard 170 which are mounted to a portion of the base housing 160 within cavity 190. Main board 165, and daughterboards such as I/O daughterboard 170 have mounted thereon integrated circuits, and other electronic devices that operate to provide the features and functionality of docking station 10. Connectors and other similar structures mounted on main board 165 can facilitate signal and data transfer within and outside the docking station 10.

Figure 5A:
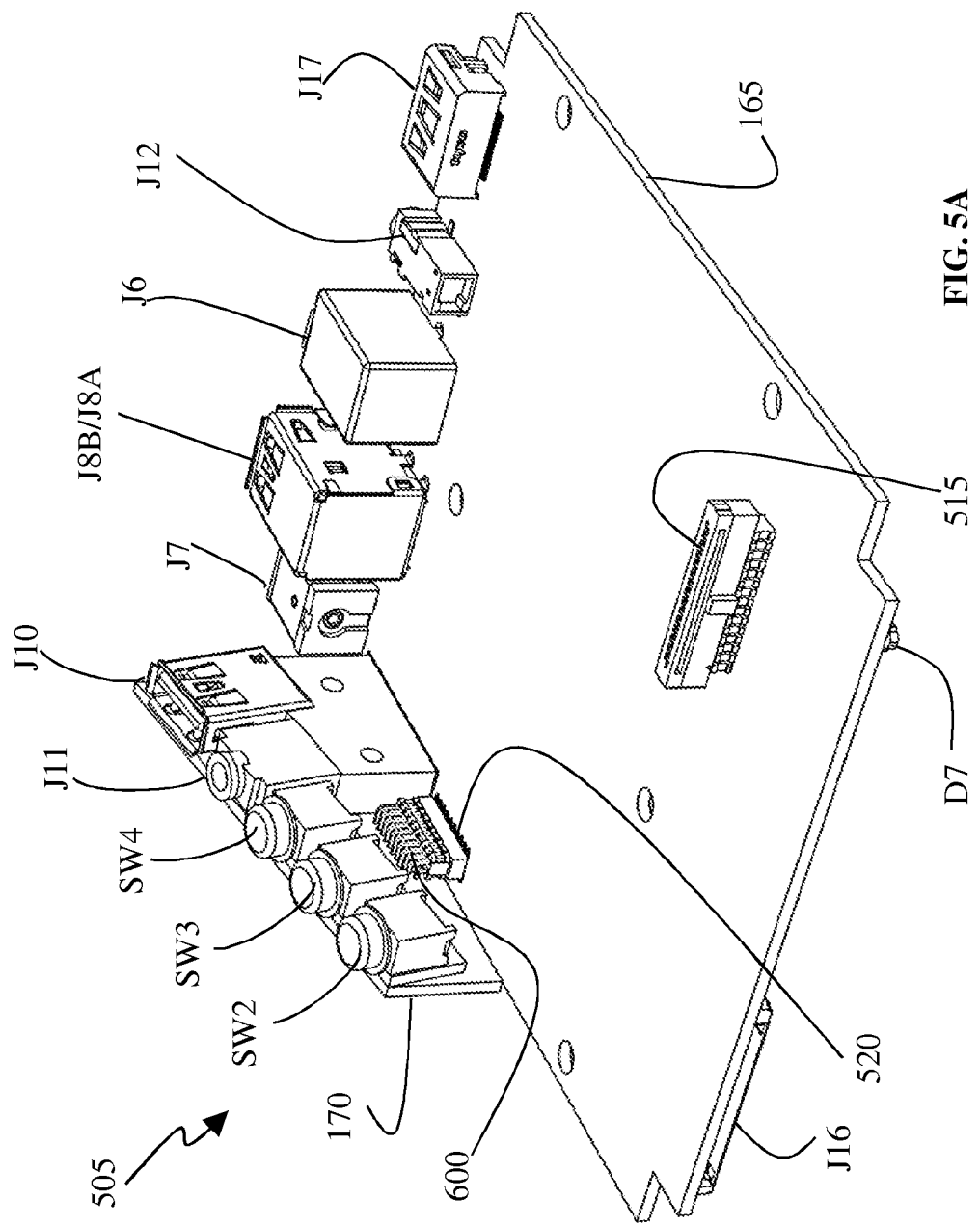
Figure 5B:
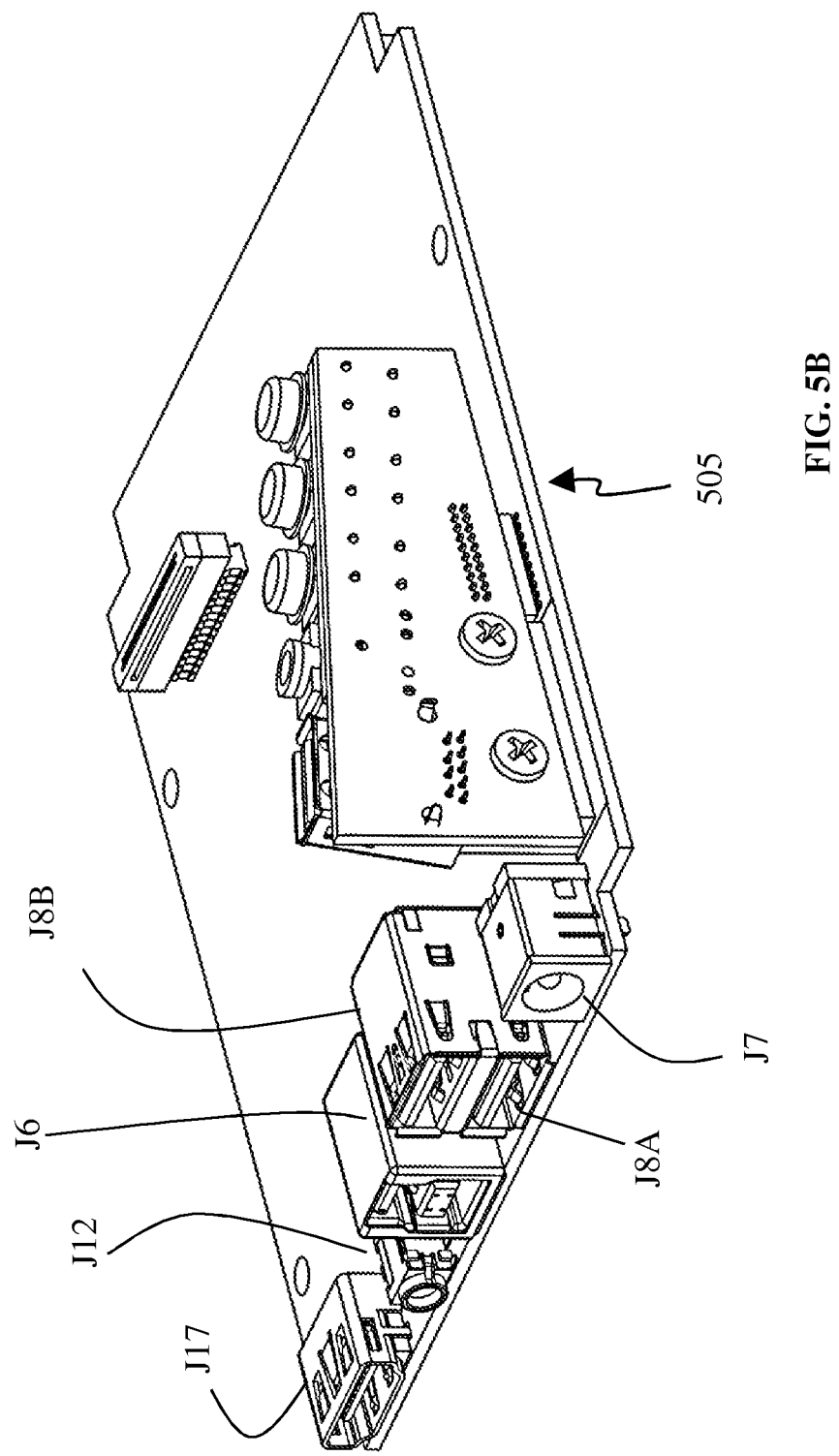
Figure 5C:
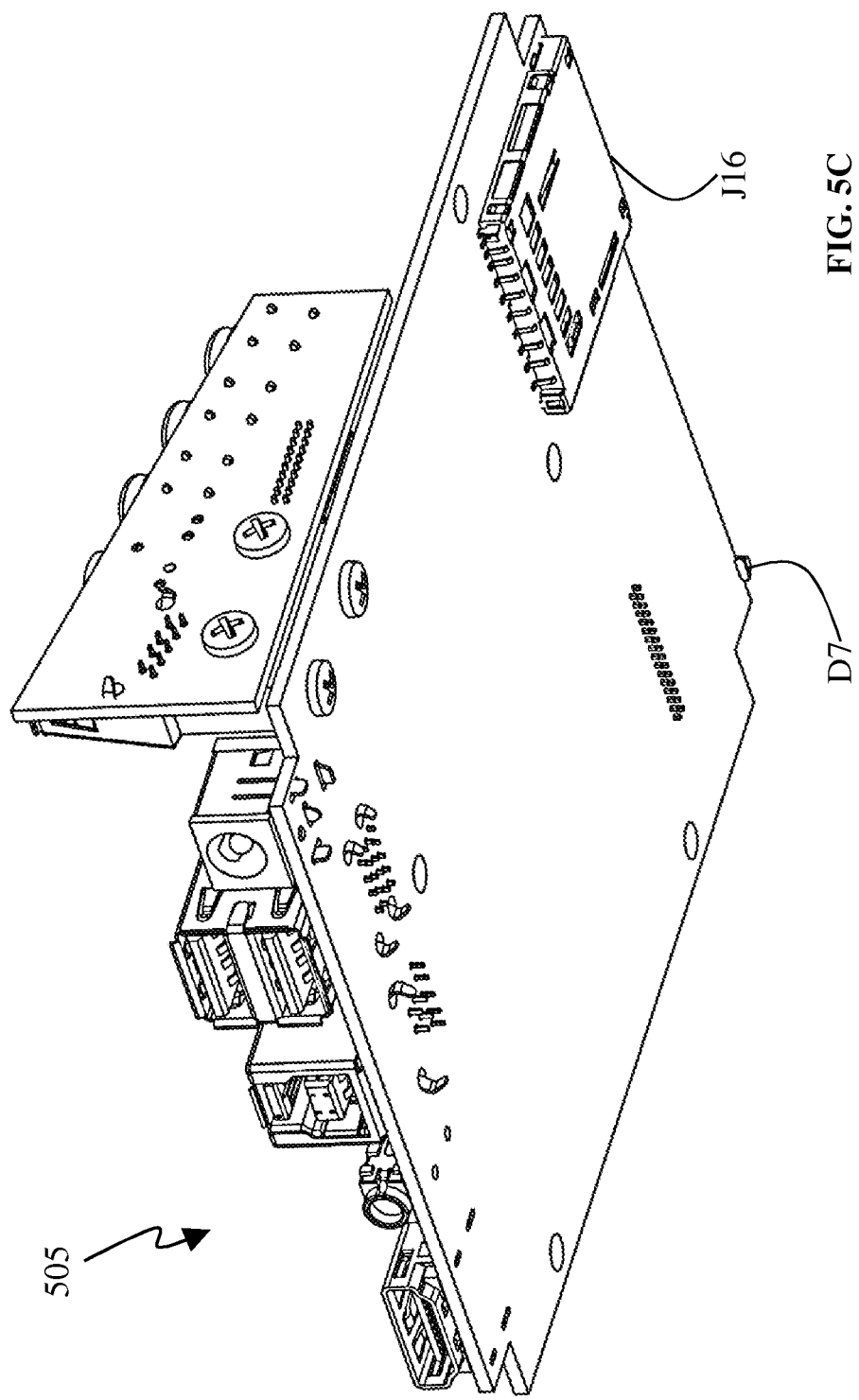
Figure 5D:
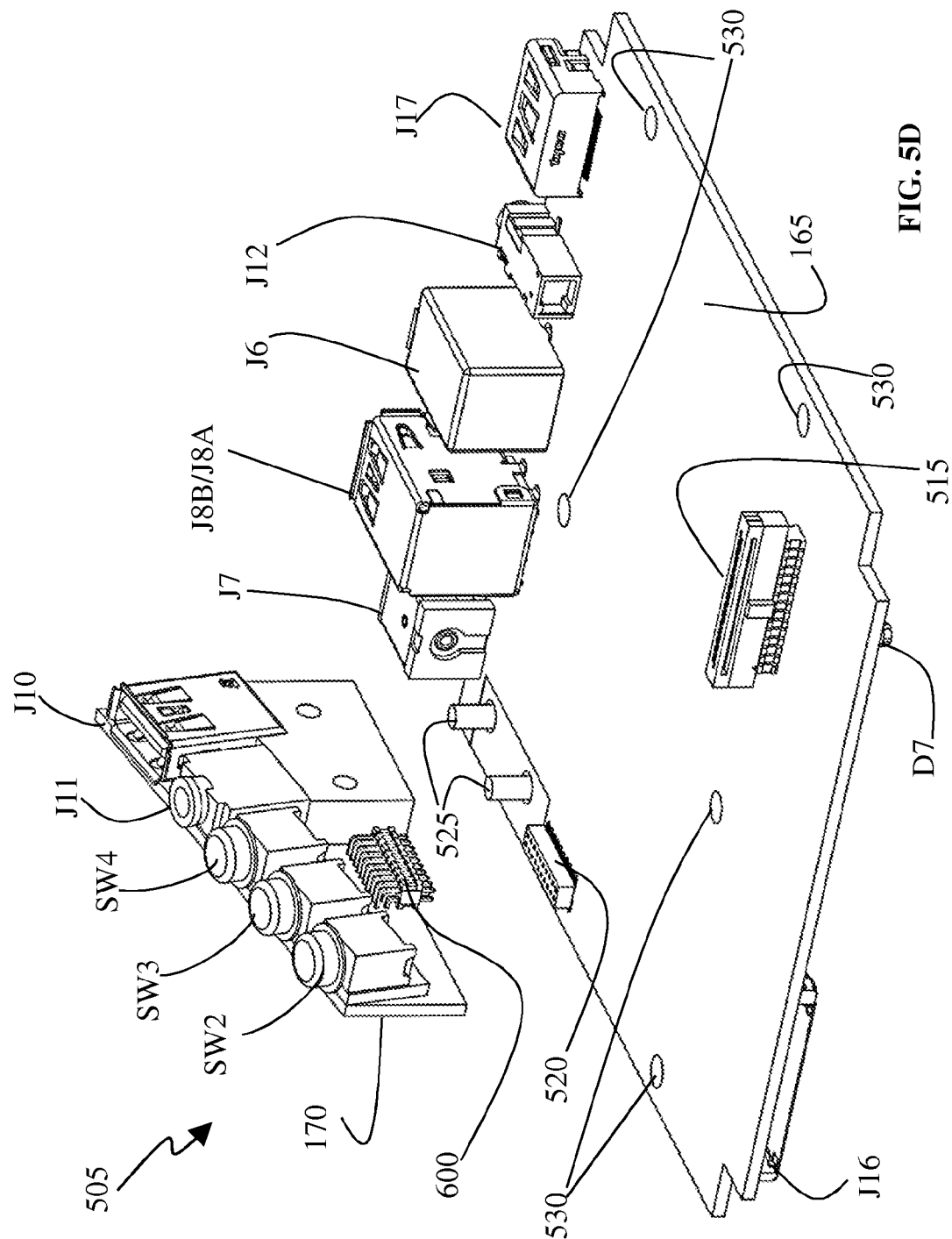
Figure 5G:
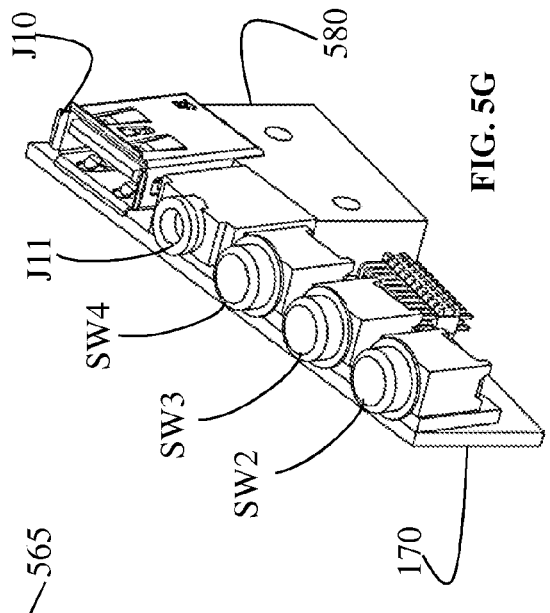
Figure 5I:
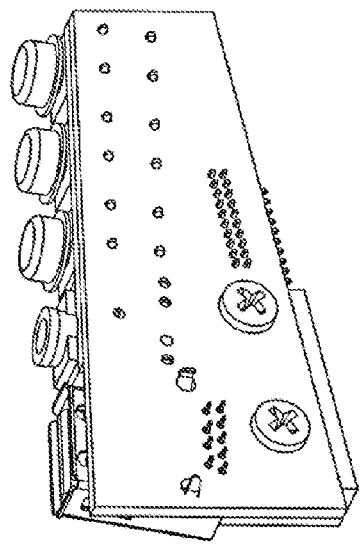

FIG. 5A is a front perspective view and FIG. 5C is a left-side bottom perspective view of an example printed circuit board assembly 505. FIG. 5D is a front isometric exploded view of PCB assembly 505. FIG. 5D depicts the example docking station 10 having a printed circuit board such as main board 165. As depicted in the illustration, main board 165 has mounted thereon HDMI connector J17, speaker jack J12, USB type B connector J6, first and second USB type A stacked connectors J8A, J8B, external power jack J7, reset switch Sw1, SD card connector J16 and Dock status indicator D7. Depending on the functionality and features supplied by the docking station 10 other connectors may be included or existing connectors de-populated on main board 165. Main board 165 can include other connectors 515 and 520 to facilitate connectivity of main board 165 to external daughter boards such as and I/O daughterboard 170. Additionally, main board 165 includes guide pins 525 and an array of openings 530. Openings 530 are sized and located to correspond to and align with standoffs 265 fitted into second aperture set 250 when main board 165 is assembled within base housing 150. Main board 165 can then be fastened to standoffs 265 using screw fasteners thereby securely anchoring main board 165 to base housing 150 and causing HDMI connector J17, speaker jack J12, USB type B connector J6, first and second USB type A stacked connectors J8A, J8B, external power jack J7, reset switch Sw1, SD card connector J16 and Dock status indicator D7 on main board 165 to be aligned with respective apertures BJ17, BJ12, BJ6, BJ8A, 8J8B, 8J7, BSw1 on base rear side wall 320 and slot BJ16 and aperture BD7 respectively on base front side wall 310 as depicted in the illustration of FIG. 4A.

Figure 5F:
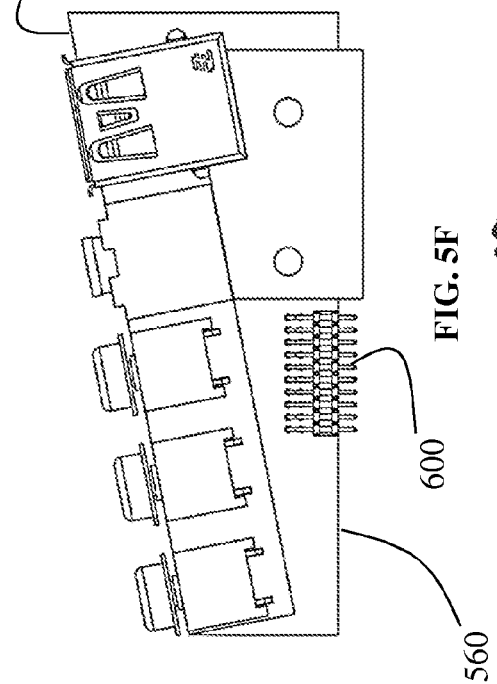
Figure 5H:
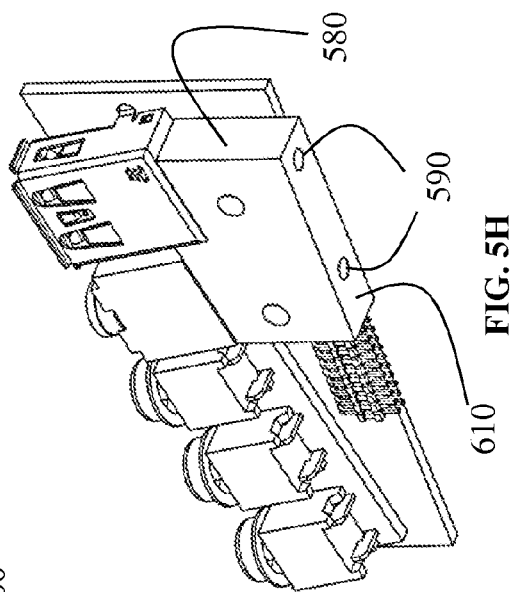

FIGS. 5F-5I depict various views of an example I/O daughterboard 170. I/O daughterboard 170 can have a trapezoidal shape as depicted in FIG. 5F, which depicts a side view of daughterboard 170. Upper edge 565 subtends a wedge angle 570 with lower edge 560. Switches sw2, sw3 and sw4, headphone jack J11 and USB type A port connector 110 are mounted to daughterboard 170 so that their datum is defined by a plane passing through upper edge 565. Connector 600 mounted proximate lower edge 560 provides a conduit for communications between daughterboard 170 and the main board 165. Support and guide block 580 can be securely fastened to daughterboard 170. Block 580 can provide bearing support for headphone jack J11 and the USB port connector J10. Block 580 can be provided with a structure that defines guide openings 590 on a lower surface 610 of guide block 580. During assembly of daughterboard 170 on main board 165, openings 590 on guideblock 580 can be brought into sliding engagement with guide pins 525 on main board 165 ensuring that connector 600 on daughterboard 170 is brought into engagement with connector 520 on main board. When surface 610 abuts main board, connectors 600 can be brought into mating relationship with connector 520.

An example structure for the dock cover 155 will now be examined in greater detail. FIGS. 6A-D depict alternative views of an example upper sub-assembly portion 150. FIG. 6A is a front isometric view, FIG. 6B is a bottom isometric view of one embodiment of the example dock cover 155. FIG. 6C is an exploded view of the example dock cover 155 illustrated in FIG. 6A. FIG. 6D is an exploded view of the example dock cover 155 illustrated in FIG. 6B.

Referring now to FIG. 6C, the example dock cover 155 can include an adapter-insert 710, a top cover 715, and/or a dock-connector board 720.

Top cover 715 can include an outer surface 725, an inner surface 735 and an intermediate lateral surface 745 extending between outer surface 725 and inner surface 735, as depicted in FIGS. 6C and 6D.

Continuous peripheral wall edge 280 of base housing 160 defines an opening 444 bounded by Inner peripheral surface 182 of continuous peripheral sidewall 180. Continuous peripheral wall edge 280 can have a thickness 555 corresponding to wall thickness 183 of continuous peripheral side wall 180. Opening 444 can have substantially the same shape as floor plate 175 of base housing 160. Outer surface 725 of top cover 715 can be appropriately dimensioned to sit upon and substantially conform to the outer dimensions of continuous peripheral wall edge 280. Outer surface of top cover 715 can be substantially rectangular with radiused corners as depicted in the illustrations.

Intermediate lateral surface 745 can have an outer periphery 748 that is appropriately dimensioned so that at least a portion of the intermediate lateral surface 745 can be slidingly received into opening 444 and remain in contact with inner peripheral surface 182 upon assembly of dock cover 155 and base housing 160. Inner surface 735 can be provided with a structure defining threaded apertures 763 proximate radiused corners of top cover 715. Upon assembly of dock cover 155 on base housing 160, threaded apertures 763 can be brought into axial alignment with apertures in first aperture set 240 in dock base 150. Threaded fasteners may be guided through apertures 240 and brought into threaded engagement with complimentary threaded apertures 763 to cause dock base 150 to be removably secured to dock cover 155 during assembly of docking station 10.

Inner surface 735 and intermediate lateral surface 745 can be recessed to define first and second "U" shaped cavities 765, 775 below outer surface 725. FIGS. 6I and 6J depict one embodiment of cavities 765, 775. Portions of outer surface 725 directly over cavity 775 can be provided with a structure defining apertures BJ10, BJ11, BSw4, Bsw3, Bsw2 through which cavity 775 is placed in fluid communication with outer surface 725. Some of these apertures are locations on outer surface 725 for user operable controls Sw4, sw3 and sw4 on I/O daughterboard 170. Some of the other apertures, BJ10 and BJ11 are locations on outer surface 725 from which connectors BJ10 and BJ11 on I/O daughterboard 170 respectively may be accessed by external connectors once the docking station 10 is assembled.

Outer surface 725 of top cover 715 can be recessed proximate a rear end of docking station 10 to define a "U" shaped recessed portion 800 as seen in FIGS. 6C and 6E. "U" shaped recessed portion 800 has peripheral surface 803 and a support surface 806. Peripheral surface 803 has lateral-right and lateral-left segments 807, 809 and a basal segment 811 which extends along a base of the "U" shaped recessed portion 800. Basal segment 811 can have a structure defining a slot 814 which places recessed portion 800 in fluid communication with first "U" shaped cavity 765 as depicted in FIG. 6D. Recessed portion 800 can be shaped and sized such that upon assembly of dock cover 155 on base housing 160, a "mouth" 814 of the "U" shaped cavity 765 defined by edges of lateral-right segment 807, basal segment 811 and lateral-left segment 809 is flush with "U" shaped cut-out 440 in base rear side wall 320 as depicted in FIG. 1A.

Adapter-insert 710 can be shaped and sized to be received within "U" shaped recessed portion 800 and be fixedly attached to lateral-right and lateral-left segments 807, 809 so that the insert occupies the region enclosed by peripheral surface 803 and support surface 806. Inner region of insert 710 can be adapted to receive and snugly retain portable electronic device 20 by, for example, choice of material of construction—a tacky material creates more friction and makes for better retention or structural features such as tabs 816 and 817 which prevent the portable electronic device 20 from being urged out of engagement from within insert 710 without sliding it out from the insert along direction of arrow 12. Inner region of insert may be dimensioned to receive a specific mobile device. Outer dimensions of insert enable it to be received within "U" shaped recessed portion 800 and thus are docking station dependent. Adapter-insert includes insert-slot 874 that aligns with slot 814 to allow mechanical interface 30 to protrude there-through.

FIG. 10A is a top view of an example adapter-insert 710. FIG. 10D is the front view, FIG. 10B is the rear view and FIG. 10C is the right-side view of the example adapter-insert 710. The example adapter-insert may be dimensioned according to the dimensions depicted in the illustrations of FIG. 10A-D.

Portions of outer surface 725 directly over cavity 765 can be provided with a structure defining grille apertures 900 through which cavity 765 is placed in fluid communication with outer surface 725. Dock-connector board 720 can be removably mounted within cavity 765 such that speakers LS300 and LS301 and microphone MIC 300 are located directly below grille apertures 900 to facilitate passage of acoustic waves to and from docking station 10. Dock connector board 720 provides a dock connector J18 representing mechanical interface 20 described before. Upon assembly of connector board 720 within cavity 765, dock connector J18 protrudes through slot 814 and insert-slot 874 for mating with complimentary connector on portable electronic device 20. Connector J22 on connector board 720 can be connected to connectors 515 on main board 165 thereby placing dock connector J18 and any portable electronic device 20 connected to it in mechanical and electrical communication with the docking station.

Figures 8A, 8B:
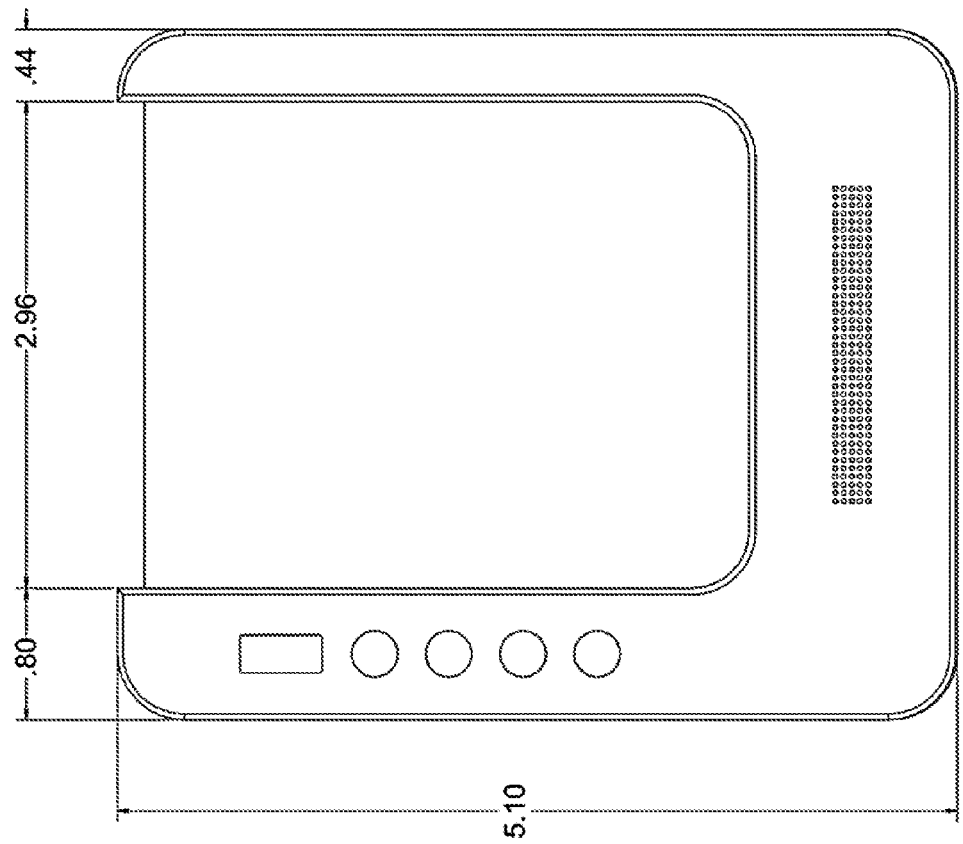
Figure 8C:
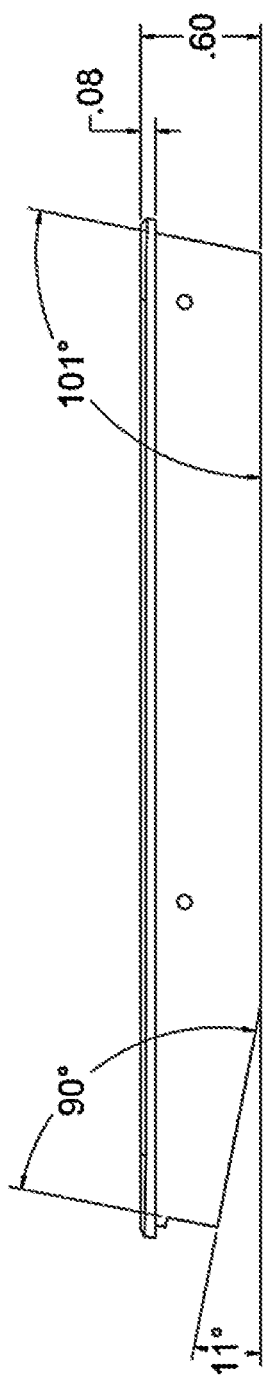
Figure 8D:
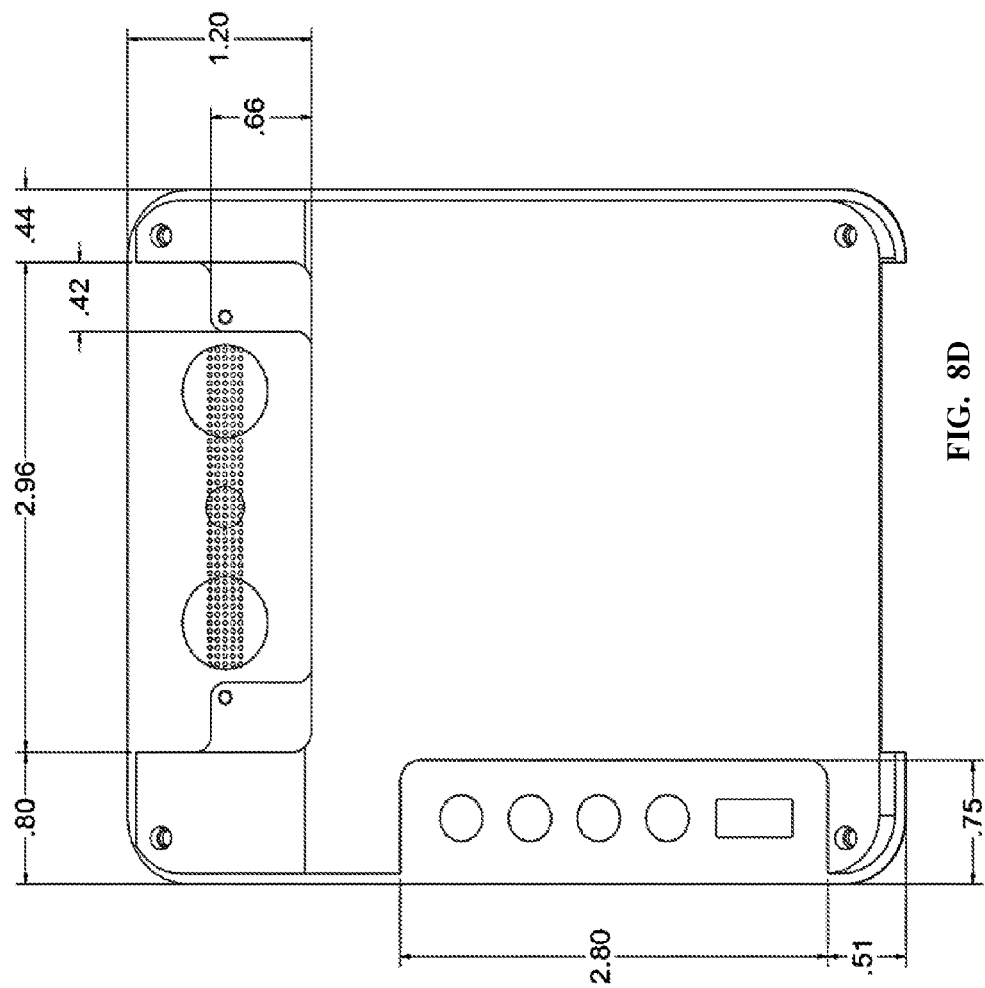

FIG. 8A is a top view of an example top cover 715. FIG. 8B is a side view of the example top cover 715. FIG. 8C is a side view of the example top cover 715 and FIG. 8D is a bottom view of the example top cover 715. The top cover 715 may be dimensioned as shown in the illustration of FIGS. 8A-C.

Circuitry

Figure 11:
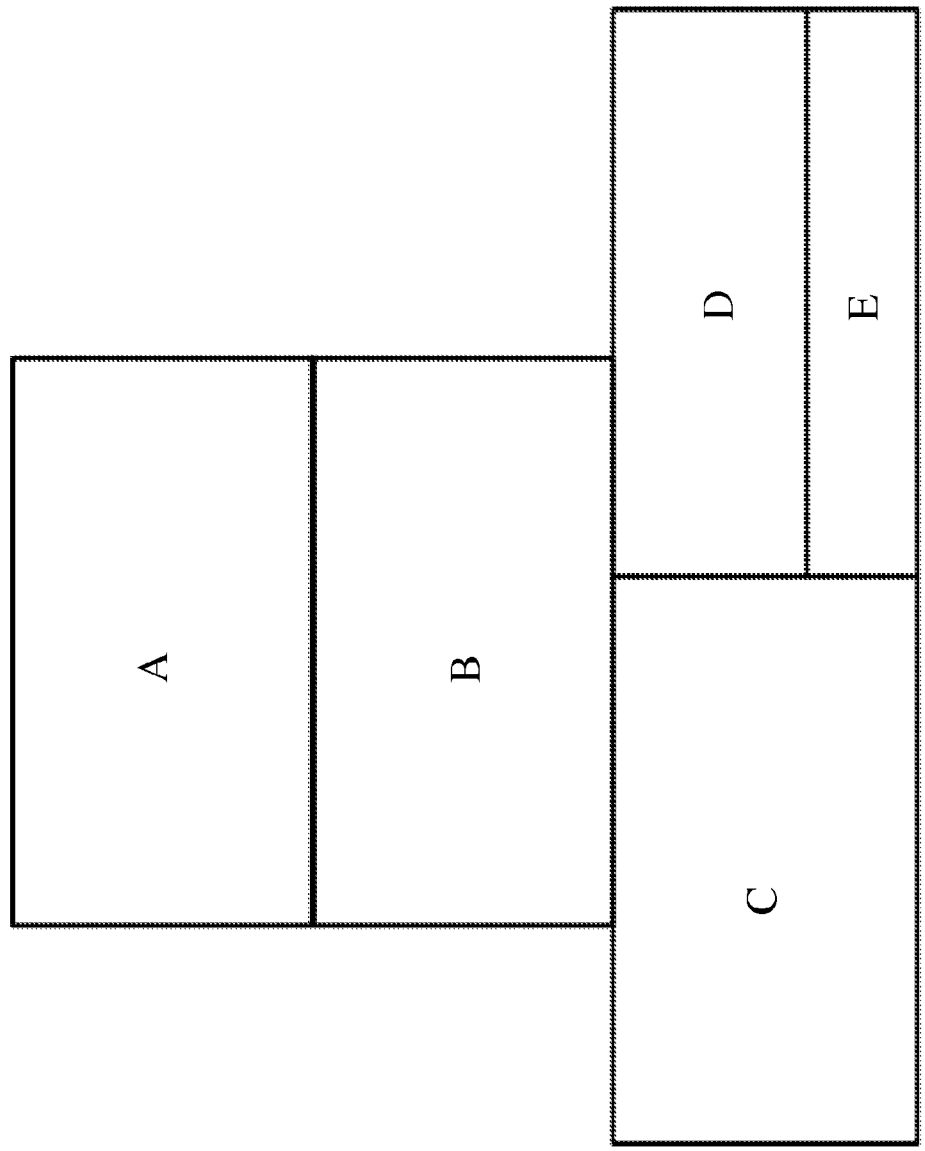

An example internal configuration of the circuitry of docking station 10 is depicted in the schematic of FIG. 11. In the depicted example, the circuitry of docking station 10 can be categorized into five blocks including USB and SD Card reader related circuitry (A), audio related circuitry (B), video related circuitry (C), microcontroller circuitry (D) and power related circuitry (E) each of which will be described in detail below. Circuit components and devices are designated using alphanumeric identifiers that are also used in the illustration of FIG. 11.

USB and SD Card Reader Circuitry

Figure 11A:
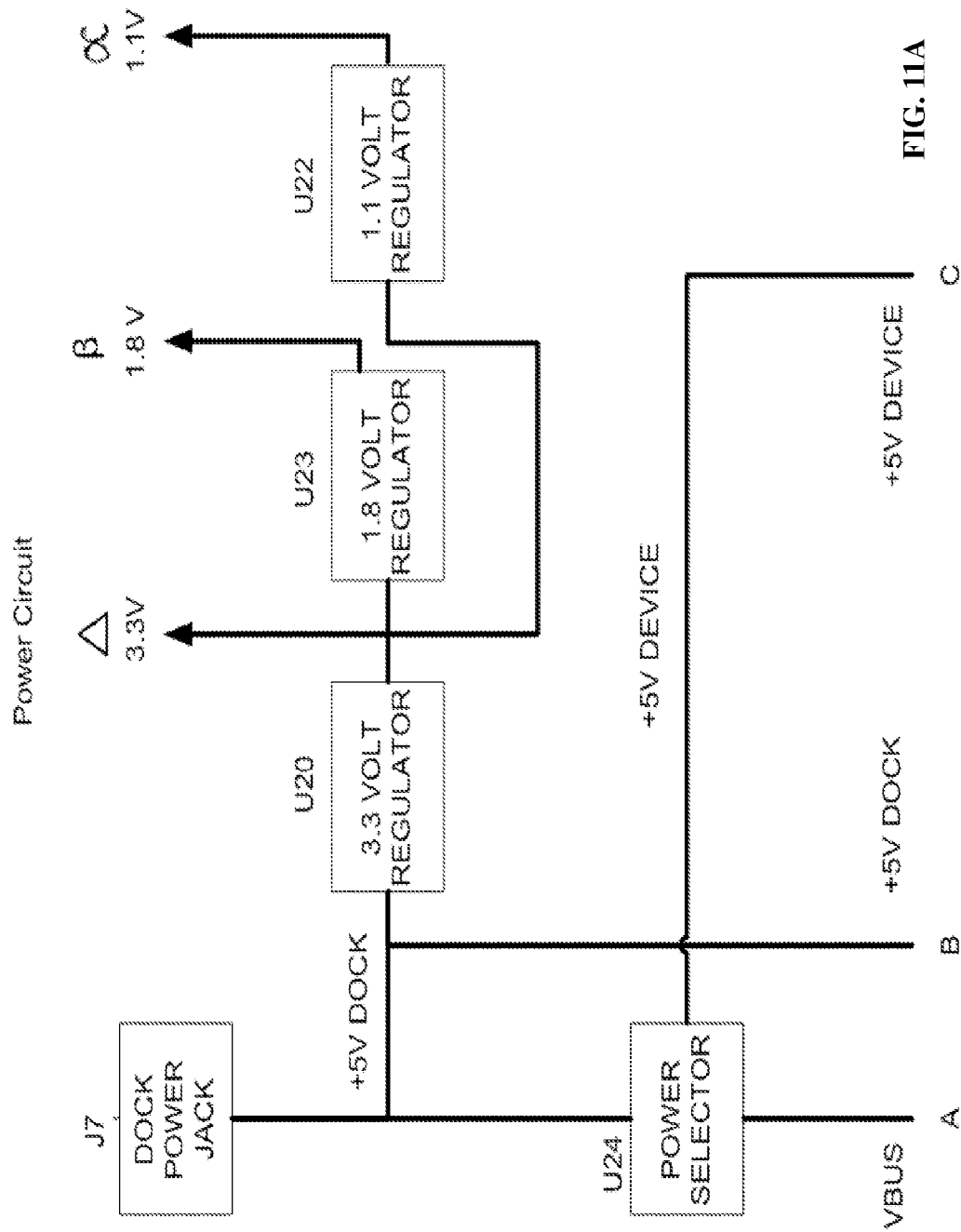
Figure 11B:
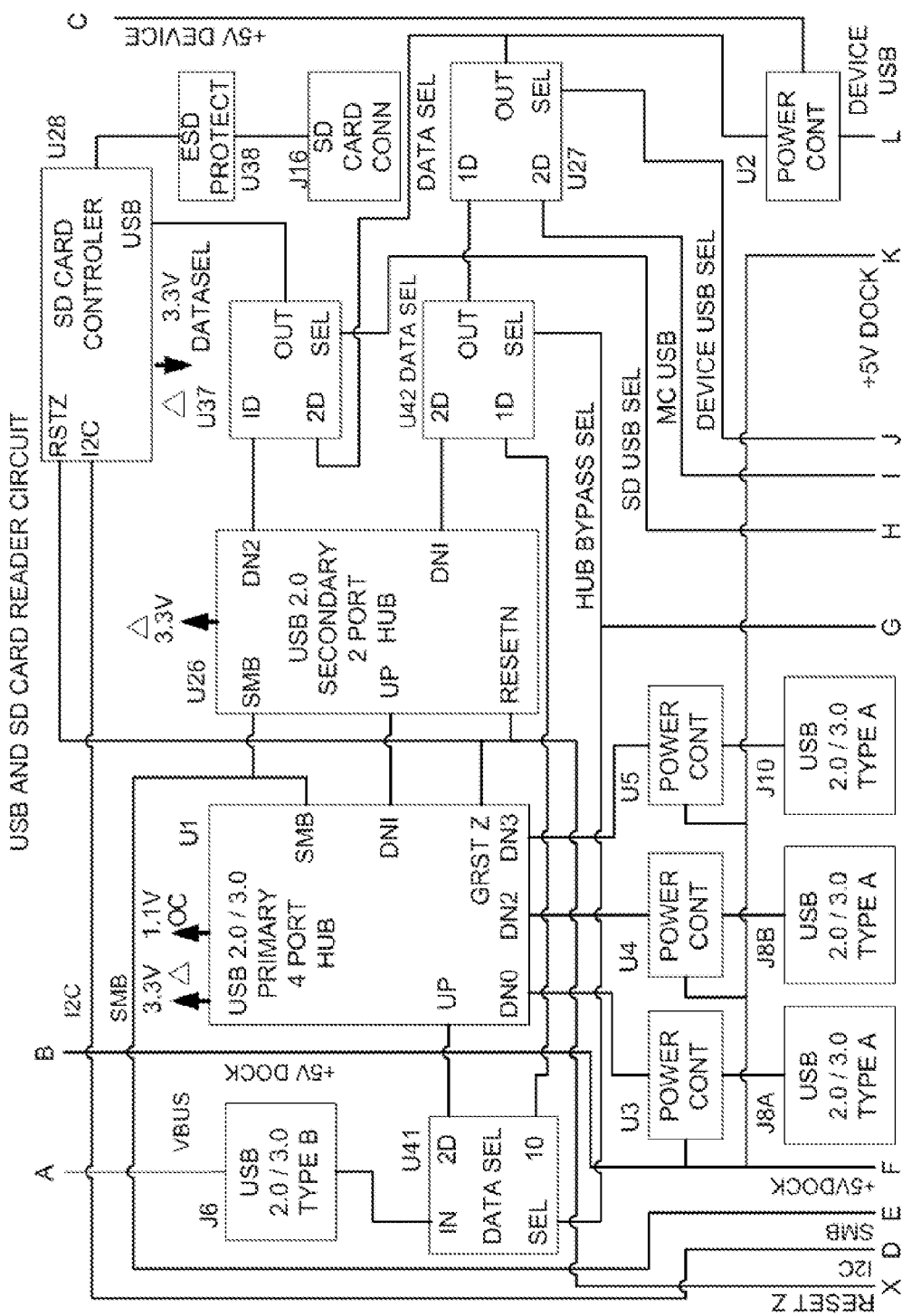

Referring to FIG. 11B, the depicted example USB circuitry can include at least one USB 2.0/3.0 4-port primary hub U1, USB 2.0 2-port secondary hub U26, a SD Card Controller U28, USB data selectors U27, U37, U41 and U42 and port power controllers U2, U3, U4 and U5.

Primary hub U1 can transfer bi-directional USB data between upstream port connector J6 through data selector U41 and three downstream port connectors J8A, J8B and J10. Secondary hub can transfer bi-directional USB data between a primary hub downstream port, connected to its upstream port and the SD Card Controller U28, connected to one downstream port through data selector U37 and the docked device connector J18 connected to the other downstream port through data selectors U27 and U42.

USB data can be routed by four USB data selectors under control of microcontroller U34. Data selector U27 can select either data selector U42 output or the microcontroller U34 as the data source/sink for the docked device connector J18. Data selectors U41 and U42 can select the data path between the upstream USB port connector J6 and data selector U27. One example data path can be through the USB primary hub U1 and secondary hub U26. Another example data path can be a direct connection between upstream USB port connector J6 and data selector U27 which bypasses the USB primary and secondary hubs.

SD Card Controller U28 can transfer bi-directional data between the data selector U37 and SD Card connector J16. Data selector U37 can select either the USB secondary hub U26 or the docked device connector J18 as the data source/sink for the SD Card reader.

Port power controllers U3, U4 and U5 can supply current-limited 5 volt DC power to the USB Vbus pin on downstream port connectors J8A, J8 B and 110 respectively. Port power controller U2 can supply current-limited 5 volt DC power to the docked device connector 118. Port power controllers U3, U4 and U5 can also have the capability to turn the Vbus power on and off and turn USB 2.0 data lines on and off. For power controllers U3, U4 and U5, this feature can be controlled by USB hub U1. In the case of power controller U2, this feature can be controlled by either USB hub U26 or the microcontroller U34.

Docked Device Host Computer Sync Mode

An example docked device USB interface on docked device connector J18 can be connected to upstream USB port connector J6, either directly or through the USB hubs U1 and U26 for synchronizing data between the docked device and host computer.

Docked Device Dock Audio/Video Record/Playback Mode

An example docked device USB interface on docked device connector J18 can be connected to microcontroller U34's USB interface for authentication and initialization processes to enable the docked device to transfer analog and digital audio and analog video through docked device connector J18.

Audio Circuitry

Figure 11C:
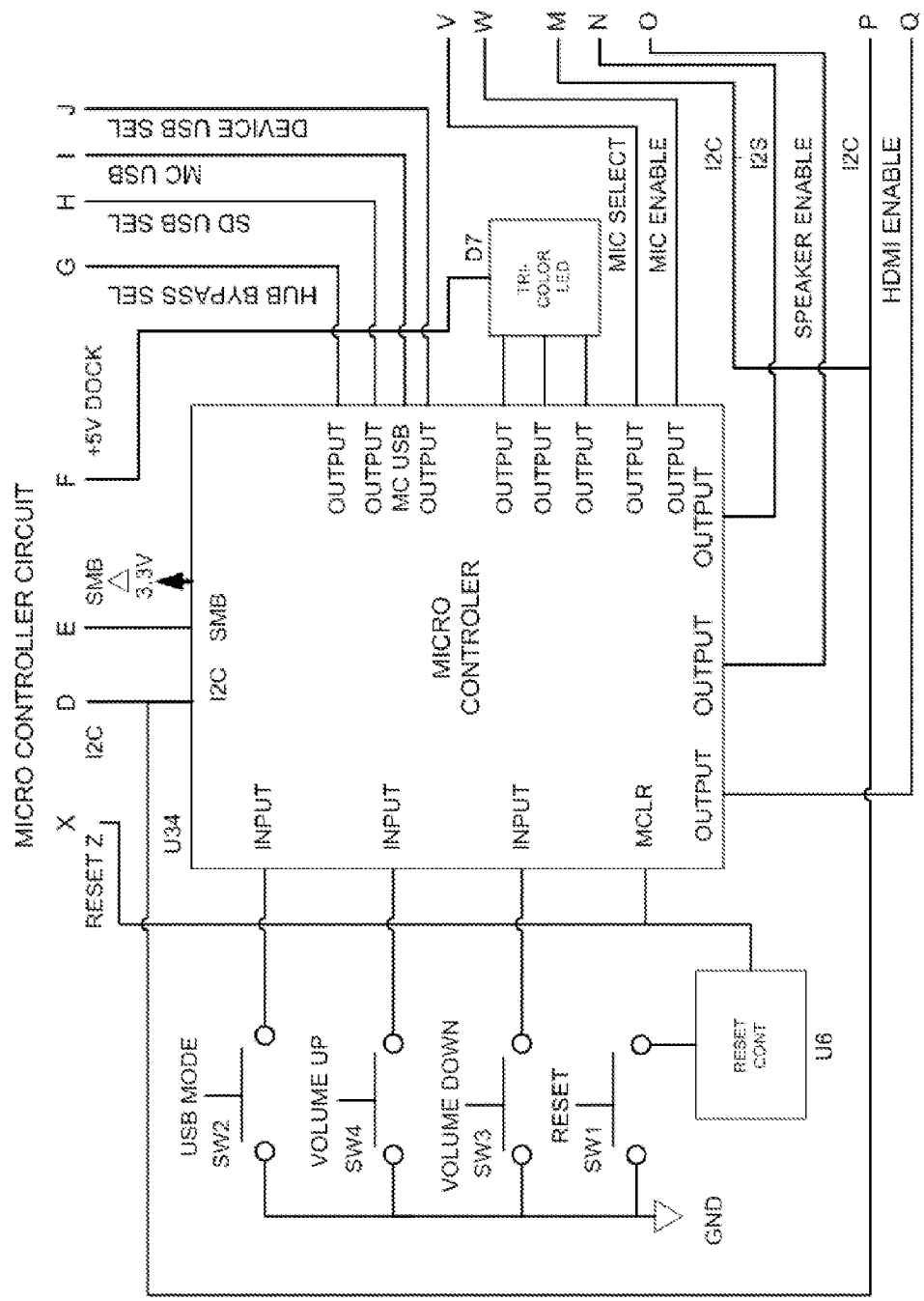
Figure 11D:
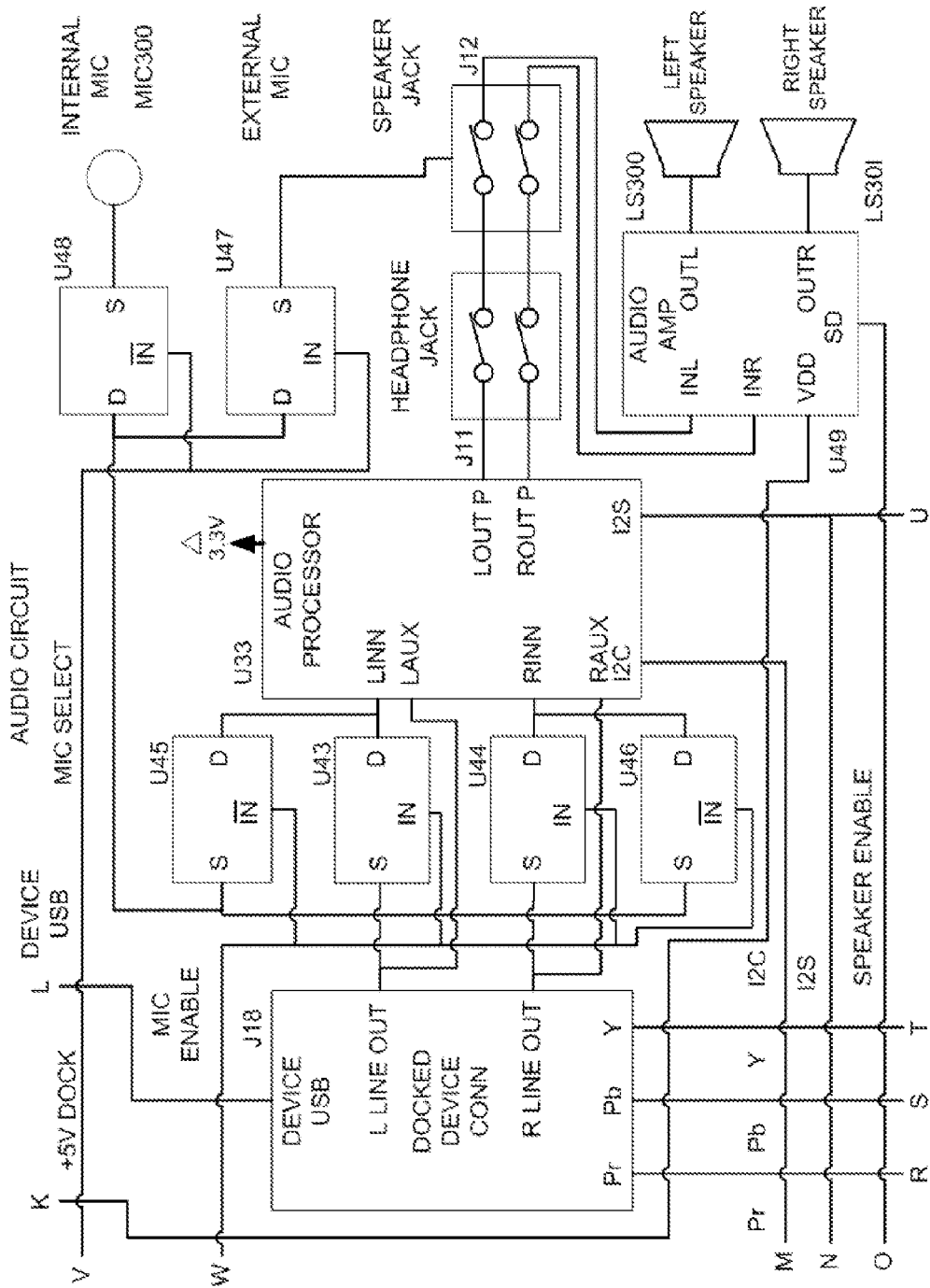

Referring to FIG. 11D, the depicted example audio circuitry includes an audio processor U33, an audio amplifier U49, a microphone MIC300, two loudspeakers LS300, LS301 and six audio path selectors U43, U44, U45, U46, U47 and U48. Audio selectors can be controlled by microcontroller U34. Audio selectors U43 and U45 can select either the docked device connector J18 or the microphone as the source for the left channel input of audio processor U33. Audio selectors U44 and U46 can select either the docked device connector J18 or the microphone as the source for the left channel input of audio processor U33. Audio selectors U47 and U48 can select either the internal microphone or the external microphone pin in speaker jack J12 as the source for the microphone input.

Docked Device Analog Audio Playback

Referring to FIG. 11B, the depicted example audio processor U33 can receive left and right analog audio signals from docked device connector J18. If the received analog audio is not accompanied by video, audio processor U33 can send left and right analog audio signals to headphone jack J11, through normally closed switches in headphone jack J11 to speaker jack J12 and through normally closed switches in speaker jack J12 to audio amplifier U49, which drives loudspeakers LS300 and LS301.

If a headphone plug is inserted into headphone jack J11, switches in J11 can open and turn off the audio signal to the speaker jack J12 and the audio amplifier U49. If a speaker plug is inserted into speaker jack J12 the switches in J12 can open and turn off the audio signal to audio amplifier U49. If the analog audio is accompanied by video, audio processor U33 can convert the analog audio signals from dock connector J18 to digital audio data and sends digital audio data through an I2S (I squared S) serial interface to the HDMI transmitter U31. The audio processor can control the volume of the analog audio signals sent to headphone jack J11, speaker jack J12 and audio amplifier U49 as commanded by the microcontroller U34 in response to Volume Down switch SW3 and Volume Up switch SW4.

Docked Device Digital Audio Playback

Digital audio data can be sent from the docked device connector J18 through a USB interface to the microcontroller U34. Digital audio data can be sent from the microcontroller U34 through an I2S serial interface to the audio processor U33. If the digital audio is not accompanied by video, the audio processor U33 can convert the digital audio to analog audio and sends it to the headphone jack J11, speaker jack J12 and audio amplifier U49, which drives loudspeakers LS300 and LS301. If the digital audio is accompanied by video, the audio processor U33 can send the digital audio data through an I2S serial interface to the HDMI transmitter U31.

Docked Device Microphone Audio Record

Audio processor U33 can convert the analog audio signal from the microphone to digital audio data and sends the digital audio data through an I2S serial interface to the microcontroller U34. The microcontroller U34 can send digital the audio data through a USB interface to the docked device connector J18.

Video Circuitry

Figure 11E:
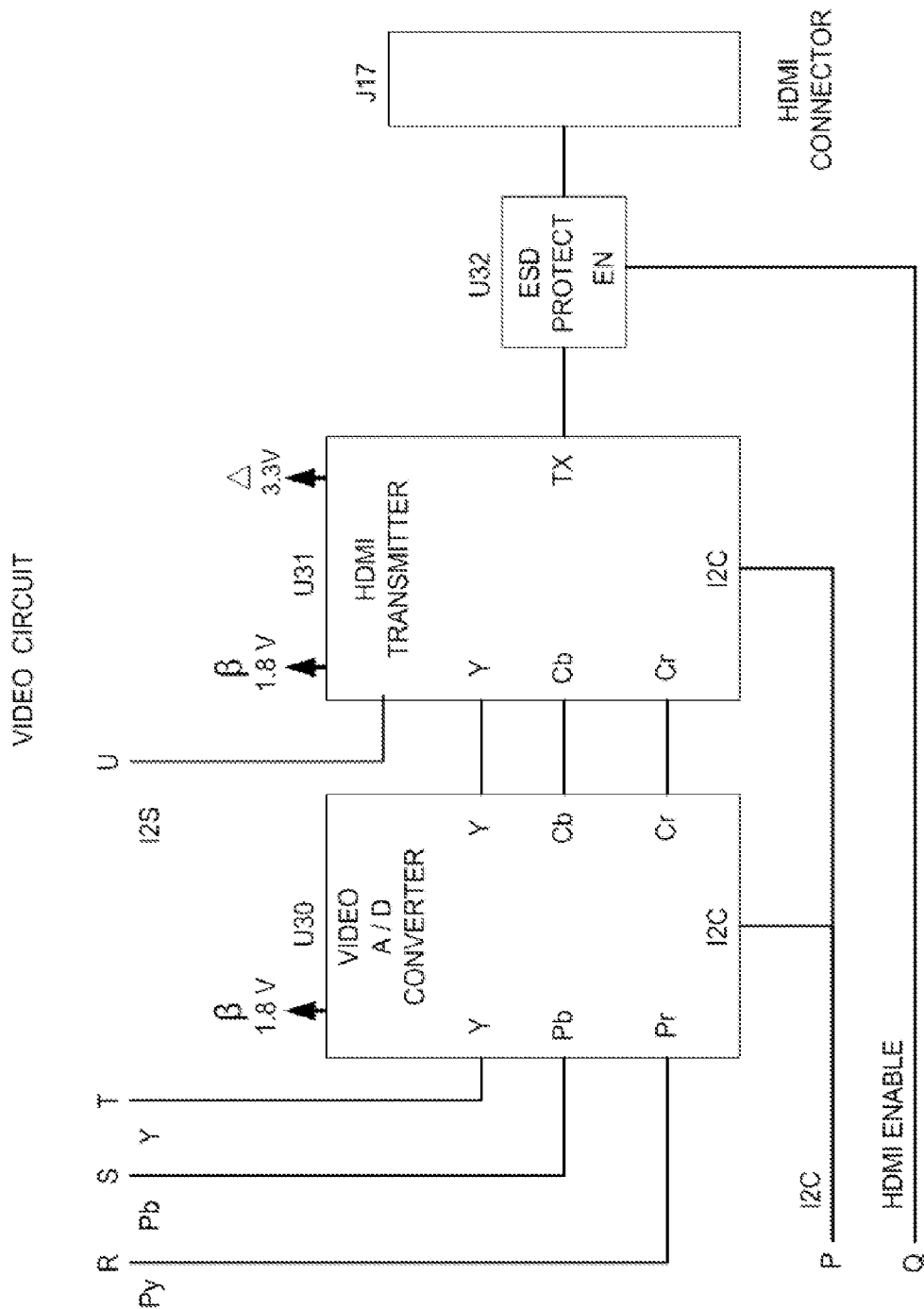

Referring to FIG. 11E, the depicted example video circuitry includes a video A-D converter U30 and an HDMI transmitter U31. Video A-D converter U30 can receive analog video signals from the docked device connector 118, can convert the analog video signals to digital video data and can send the digital video data to the HDMI transmitter U31. The HDMI transmitter can receive digital audio data from audio processor U33 and digital video data from video A-D converter U30, formats the digital audio and video data in HDMI format and sends the HDMI formatted data to HDMI connector J17.

Microcontroller Circuitry

Referring to FIG. 11C, operation of a dock can be controlled by a firmware program running in an example microcontroller U34. Microcontroller U34 can perform initialization and configuration of the USB hubs U1 and U26 through an SMB serial interface and can perform initialization and configuration of the Authentication Coprocessor U40, SD Card controller U28, audio processor U33, video A-D converter U30 and HDMI transmitter U31 through an I2C serial interface upon power-up or closing of the Reset switch SW1.

In Docked Device Dock Audio/Video Record/Playback Mode, microcontroller U34 can communicate with the docked device through a USB interface to perform authentication and initialization processes with the docked device and transfer digital audio data to and from the docked device. The microcontroller U34 can communicate with the Authentication Coprocessor U40 through an I2C serial interface to compute authentication data during the authentication process.

Microcontroller U34 can control the USB data path configuration through USB data selectors U27, U37, U41 and U42 in response to closures of the USB Mode switch SW2. The microcontroller U34 can monitor the state of the Volume Down switch SW3 and Volume Up switch SW4 and sends data to the audio processor U33 through an I2C serial interface to control the volume of the analog audio signals sent to headphone jack J11, speaker jack J12 and audio amplifier U49. Microcontroller U34 can control audio selectors U43, U44, U45, U46, U47 and U48 to select the source of the audio processor analog audio inputs and to select the source of the microphone input.

The microcontroller can light combinations of the LEDs in the tri-color LED D7 to indicate various operating modes and conditions of the dock.

Power Circuitry

Referring to FIG. 11A, the depicted example power circuitry is includes a power input jack J7, power selector U24, 3.3 volt regulator U20, 1.8 volt regulator U23 and 1.1 volt regulator U22. Power input jack J7 can receive 5 volt DC power from an external wall plug power supply and supplies power to the power selector U24, 3.3 volt regulator U20, 1.8 volt regulator U23 and 1.1 volt regulator U22. Regulator U20 can convert the 5 volt DC power to 3.3 volt DC power and supplies power to USB hubs U1 and U26, SD Card Controller U28, audio processor U33, video A/D converter U30 and microcontroller U34. Regulator U23 can convert the 5 volt DC power to 1.8 volt DC power and supplies power to video A/D converter U30 and HDMI transmitter U31. Regulator U22 can convert the 5 volt DC power to 1.1 volt DC power and supplies power to USB hub U1. The power selector U24 can supply 5 volt DC power from power input jack J7 to the docked device when the dock is not connected to a host computer through the upstream USB port connector J6. Power selector U24 can supply USB Vbus 5 volt DC power from the USB upstream port connector J6 to the docked device when the dock is connected to a host computer through the upstream USB port connector J6.

Although a few implementations have been described in detail above, other modifications are possible. Moreover, other configurations, components, and/or features can be included in a docking station. Other components may be added to, or removed from, the described systems. Accordingly, other implementations are within the scope of the following claims.

What is claimed is:

1. A docking station comprising: a base that is configured to be positioned substantially parallel to a surface on which the docking station is placed; sidewalls that extend from the base; and a top cover that is attached to the sidewalls, the top cover including: a tray that is configured to slidably receive a particularly sized portable electronic device at an angle between 5 and 25 degrees relative to the base, and to surround substantially an entirety of a bottom edge of a peripheral surface of the device, at least half of a first side edge of the peripheral surface of the device, and at least half of a second side edge of the peripheral surface of the device when the device is received in the tray, the tray configured to be open to a top edge of the peripheral surface of the device when the device is received in the tray; wherein the tray is capable of being removed from the docking station, wherein the docking station is capable of receiving a replacement tray for a differently sized portable electronic device; and a physical interface that is configured to physically connect with an interface of the portable electronic device, the physical interface being located at a bottom end of the tray.

2. The docking station of claim 1, wherein, in a working orientation of the docking station, the portable electronic device is provided at a near horizontal angle when the device is received in the tray.

3. The docking station of claim 1, further comprising one or more embedded microphones that are mounted to the base, the sidewalls, or the top cover.

4. The docking station of claim 1, further comprising a microphone jack that is configured to interface with one or more external microphones.

5. The docking station of claim 1, wherein: the physical interface is configured for use with a particular portable electronic device, and the physical interface is removable and replaceable with another physical interface for a different portable computing device.

6. The docking station of claim 1, wherein the physical interface comprises an 8-pin connector, a 15-pin connector, or a 19-pin connector.

7. The docking station of claim 1, wherein the tray is configured to slidably receive the portable electronic device at a near horizontal angle when the base is oriented horizontally.

8. The docking station of claim 1, wherein the tray is configured to receive the portable electronic device by guiding the first side edge and the second side edge of the device along respective lengths of the first side edge and the second side edge as the device is inserted near a top of the tray and caused to slide into engagement with the physical interface.

9. The docking station of claim 1, wherein the tray is configured to be secured to the top cover using a plurality of threaded fasteners.

10. The docking station of claim 1, wherein the portable electronic device is a smartphone that includes an integrated touch-sensitive electronic display.

11. The docking station of claim 1, wherein at least an inner region of the tray that holds the portable electronic device when the device is received in the tray is constructed of a material that is configured to facilitate retention of the device in the tray due to friction between the device and the tray.

12. The docking station of claim 1, wherein the docking station includes one or more of a universal serial bus (USB) port, a secure digital (SD) card receiver, and a speaker jack.

13. The docking station of claim 1, further comprising circuitry that is configured to transfer analog or digital video between an external electronic device and the portable electronic device when the portable electronic device is connected to the physical interface.

14. A docking station comprising: a base that is configured to be positioned substantially parallel to a surface when the docking station is placed on the surface in a working orientation; a top cover that is configured to be positioned above the base, the top cover including a recess that is configured to receive a tray; the tray, wherein the tray includes one or more inner surfaces that are shaped to slidably receive and support a particularly sized portable electronic device on at least a portion of the one or more inner surfaces of the tray without covering a top edge of a peripheral surface of the portable electronic device when the device is received in the tray, wherein the one or more inner surfaces of the tray surround substantially an entirety of a bottom edge of the peripheral surface of the portable electronic device and surround at least half of a first side edge and at least half of a second side edge of the peripheral surface of the portable electronic device when the device is received in the tray, wherein the tray is capable of being removed from the docking station and wherein the docking station is capable of receiving a replacement tray for a differently sized portable electronic device; and a physical interface that is configured to physically connect with an interface of the portable electronic device when the portable electronic device is received in the tray, wherein the top cover and the tray cooperate to orient the portable electronic device at an angle between 5 and 25 degrees relative to the base when the portable electronic device is received in the tray.

15. The docking station of claim 14, wherein the top cover and the base cooperate to form an enclosure for housing at least one electronic circuit.

16. The docking station of claim 14, wherein the recess in the top cover is angled between 5 and 25 degrees relative to the base when the top cover and the base are assembled in the docking station.

17. One or more trays for receiving and supporting particularly sized portable electronic devices in a docking station that is capable of receiving different trays for differently sized portable electronic devices, each tray including one or more outer surfaces that are (i) shaped to be complementary to one or more surfaces of a housing of the docking station and (ii) configured to engage with the one or more outer surfaces of the housing so as to detachably couple the tray to the housing, each tray including one or more inner surfaces that are shaped to slidably receive a particularly sized portable electronic device that is inserted from a top end of the tray and to support the portable electronic device at an angle between 5 and 25 degrees from horizontal when (i) the portable electronic device is received in the tray and (ii) the tray is coupled to the housing, wherein the one or more inner surfaces of each tray are configured to surround substantially an entirety of a bottom edge of a peripheral surface of the particularly sized portable electronic device and to surround at least half of a first side edge and at least half of a second side edge of the peripheral surface of the portable electronic device when the device is received in the tray, wherein each tray is structured so as to allow physical connection of an interface of the particularly sized portable electronic device with a physical interface of the docking station when the portable electronic device is received in the tray.

* * * * *